(12) United States Patent
Suganuma

(10) Patent No.: US 6,249,381 B1
(45) Date of Patent: Jun. 19, 2001

(54) ILLUMINATING METHOD AND ILLUMINATING DEVICE

(75) Inventor: Hiroshi Suganuma, Ibaraki (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/298,273

(22) Filed: Apr. 23, 1999

(30) Foreign Application Priority Data

May 13, 1998 (JP) .................................................. 10-130220

(51) Int. Cl.$^7$ ........................... G02B 27/10; G02B 27/02; G02B 6/04

(52) U.S. Cl. ........................... 359/618; 359/799; 385/115

(58) Field of Search .................................... 359/618, 719, 359/799; 385/27, 72, 15, 24, 115; 362/259, 553, 559

(56) References Cited

U.S. PATENT DOCUMENTS

| 4,619,508 | * 10/1986 | Shibuya et al. ..................... 353/122 |
| 5,978,528 | * 11/1999 | Fidric ..................................... 385/24 |

FOREIGN PATENT DOCUMENTS

| 60-230629 | 11/1985 | (JP) ............................... G02B/27/00 |
| 2-98919 | * 11/1990 | (JP) ............................... H01L/21/027 |
| 10-284776 | * 11/1998 | (JP) ............................... G20B/6/293 |

OTHER PUBLICATIONS

T. Ishigure et al., "Graded–Index Polymer Optical Fiber For High–Speed Data Communication," Applied Optics, vol. 33, No. 19, Jul. 1, 1994, pp. 4261–4266.

D. Gloge, "Optical Power Flow In Multimode Fibers," The Bell System Technical Journal, vol. 51, No. 8, Oct. 1972, pp. 1767–1783.

D. Gloge, "Impluse Response Of Clad Optical Multimode Fibers," The Bell System Technical Journal, vol. 52, No. 6, pp. 801–816.

D. Kohler et al., "Speckle Reduction In Pulsed–Laser Photographs," Optics Communications, vol. 12, No. 1, Sep. 1974, pp. 24–29.

M. Tsubokura et al., "Improvement Of Hollow Guide For UV Laser Power Delivery," The Japan Society Of Applied Physics, Extended Abstracts (The 58th Autumn Meeting), Oct. 1997, Lecture Meeting Manuscripts, 3a–SR–18, p. 1091.

(List continued on next page.)

*Primary Examiner*—Georgia Epps
*Assistant Examiner*—David Seyrafi
(74) *Attorney, Agent, or Firm*—Limbach & Limbach L.L.P.

(57) ABSTRACT

The number of light sources and the number of divided light beams are optimized, so that a light beam with sufficiently reduced speckle contrast can be used as illuminating light. In an optical system for forming an image through a spatial modulator, laser light having a spectrum width of wave number and emitted from N (N is an integer not less than 1) light sources is guided to a fiber bundle so that the light is divided into M light beams (M is an integer not less than 2), a light path length difference of not less than a coherent distance is given to the respective light beams, and then, light axes are again aligned with each other to illuminate the spatial modulator, and when the light path length difference from one point on the spatial modulator to an image corresponding thereto has a standard deviation $\sigma_z$, the number M and the number N are set so that a relation expressed by the following expression A is satisfied:

(numerical expression 49)   Expression A $$\sqrt{NM} \cdot \sqrt[4]{1 + (2 \cdot W \cdot \sigma_z)^2} \geq 1$$

36 Claims, 19 Drawing Sheets

OTHER PUBLICATIONS

Ogoshi et al., "Optical Fibers," OHM Publishers, 1983, Chapter 9, pp. 234–249.

"Topics In Applied Physics–Laser Speckle And Related Phenomena," vol. 9, Springer–Verlag Publishers, 1984, G. Parry, "Speckle Patterns In Partially Coherent Light," pp. 92–93.

E. Rawson et al., "Frequency Dependence Of Model Noise In Mutlimode Optical Fibers," J. Opt. Soc. Am., vol. 70, No. 8, Aug. 1980, pp. 968–976.

H. Fujii et al., "A Contrast Variation Of Image Speckle Intensity Under Illumination Of Partially Coherent Light," Optics Communications, vol. 12, No. 1, Sep. 1974, pp. 32–37.

E. Rawson et al., "Speckle–Free Rear–Projection Screen Using Two Close Screens In Slow Relative Motion," J. Opt. Soc. AM. vol. 66, No. 11, Nov. 1976, pp. 1290–1294.

B. Dingel et al., "Laser–Diode microscope With Fiber Illumination," Optics Communications, vol. 93, No. 1,2, Sep. 1992, pp. 27–32.

B. Dingle et al., "Speckle Reduction With Virtual Incoherent Laser Illumination Using A Modified Fiber Array," Optik, 94, No. 3, 1993, (Received Aug. 17, 1992), pp. 132–136.

T. Ishigure et al., "Graded–Index Polymer Optical Fiber For High Speed Data Communication," Applied Optics, vol. 33, No. 19, Jul. 1, 1994, pp. 4261–4266.

M. Tsubokura et al., "Improvement Of Hollow Light Guide For UV Laser Power Delivery," The Japan Society Of Applied Physics, Extended Abstracts (The 58th Meeting 1997), Oct. 1997, p. 1091.

M. Imai, "Fluctuating Properties Of Optical Fiber And Its Speckle," vol. 8, No. 3, Jun. 1979, pp. 128–134.

* cited by examiner

FIG.6
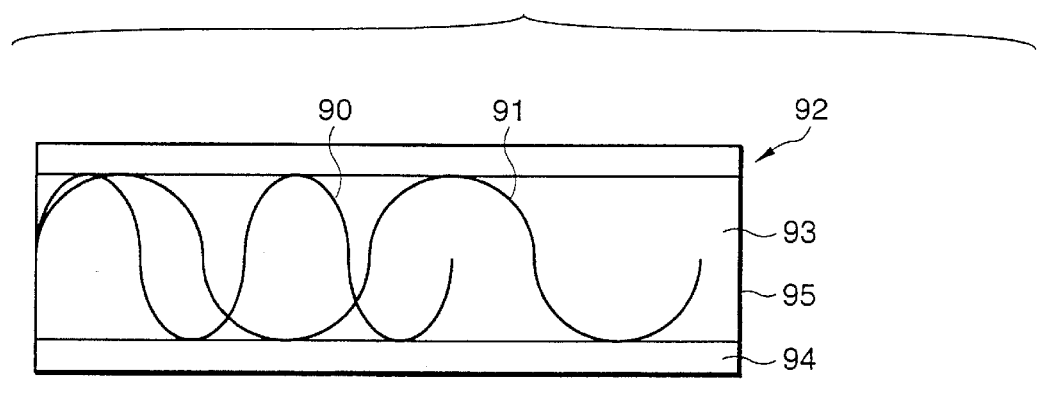
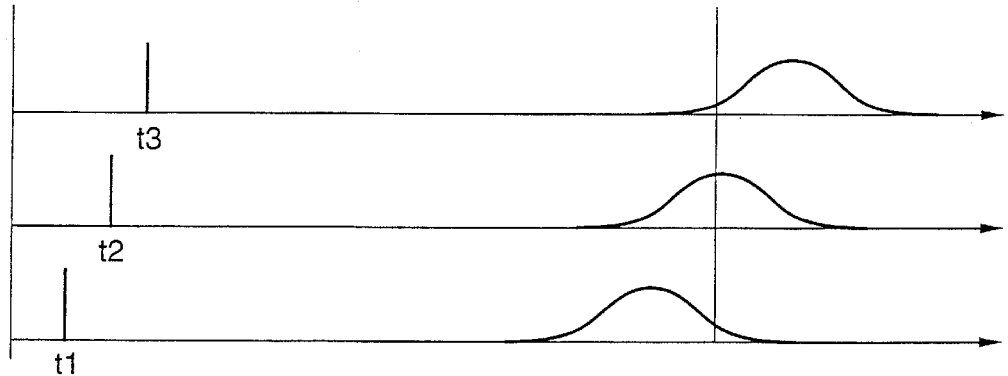

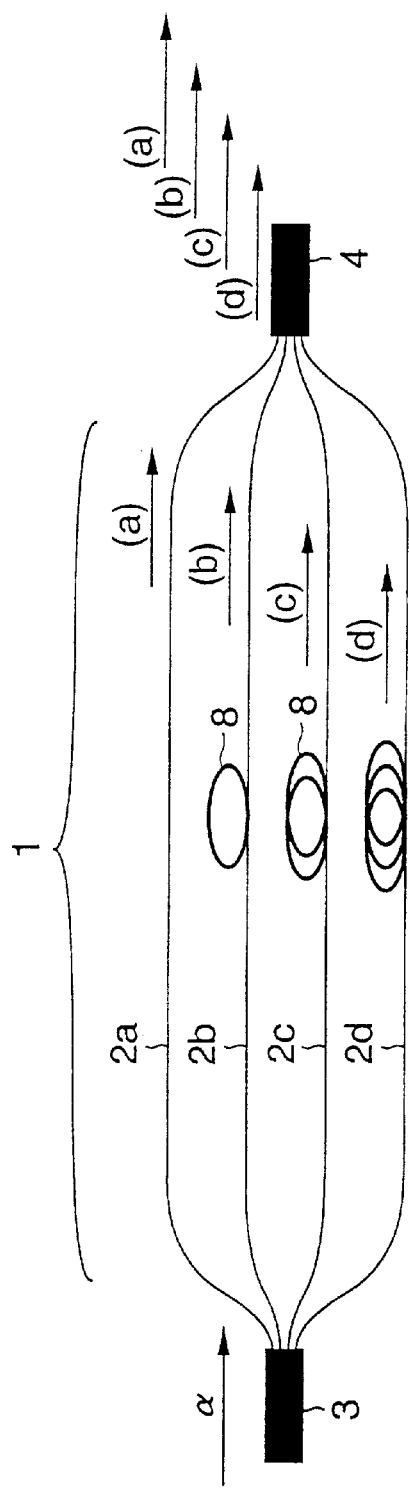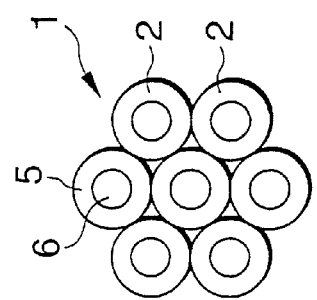

ILLUMINATING METHOD AND ILLUMINATING DEVICE

BACKGROUND OF THE INVENTION

1. Field of the Invention

The present invention relates to an illuminating method and an illuminating device for producing an illuminating light beam for a display device, a measuring device, a microscope, an exposure device, or the like.

2. Description of the Related Art

Conventionally, as a light source for illuminating light used in an illuminating device of, for example, a projection type liquid crystal display or a measuring device, an incoherent light source such as a lamp or light emitting diode (LED) has been used.

On the contrary, trials to use laser light from a laser light source, such as a solid-state laser, a gas laser, or a semiconductor laser, for illuminating light have been carried out. The laser light is superior in directionality and has high intensity, and is a light beam of high coherence. However, speckle resulting from high coherence becomes the most difficult technical problem.

For example, a semiconductor laser is a light source which has a very high photoelectric conversion efficiency and emits laser light with excellent directionality. However, it has been hardly used as an illuminating light source because of the problem of speckle due to high coherence.

In the 1970s, although studies of a display (hereinafter referred to as a laser display) using laser light were carried out at various places, in addition to problems of insufficient output of the light source and the modulation method, the problem of speckle was one of the problems which became obstacles against realization in practical use.

In recent years, the development of elementary techniques as key components of a laser display, such as a high output laser using wavelength conversion of a solid-state laser, semiconductor lasers capable of oscillating three primary colors of red (R), green (G), and blue (B), and a spatial modulator (light valve) using a liquid crystal or a micromachine, have been made at a high pace.

It is known that the contrast of speckle highly depends on the spectrum width of a light beam emitted from a light source. When the center wavelength of the light beam is $\lambda_0$, the full width at half maximum of the wavelength spectrum is $\Delta\lambda$, the spectrum width of the wave number is W, and the spectrum of the wave number is S(k), that is, (numerical expression 13)

$$W = -\frac{\pi}{\sqrt{2}} \cdot \frac{\Delta k}{\lambda_0^2}$$

$$S(k) = \frac{\mathrm{Exp}\left[-\frac{(k-k_0)^2}{2 \cdot W^2}\right]}{\sqrt{2\pi} \cdot W}$$

an object is illuminated with this light, and in an optical system for forming an image of the object, when the light path length difference from one point on the object to its corresponding image has fluctuation of a standard deviation of $\sigma_Z$, it is known that the standard deviation $\sigma_I$ of speckle intensity to the mean value <I> of illumination intensity is obtained by (numerical expression 14)

$$\frac{\sigma_I^2}{\langle I \rangle^2} = \frac{1}{\sqrt{1 + (2 \cdot W \cdot \sigma_Z)^2}}$$

(see G. Parry, "Laser Speckle and Related Phenomena", pp. 93, Springer-Verlag, 1984).

When N speckle patterns which are incoherent from each other (that is, they do not interfere with each other) and have no correlation, are superimposed, the sum becomes an intensity sum of the respective speckle patterns. At this time, the contrast of speckle is lowered to $1/\sqrt{N}$.

For example, when N optical fibers are bundled, and the length of each of the optical fibers is changed by a length not less than a coherence length, it becomes possible to neglect the interference between the respective optical fibers. The speckle at this time is superposition of intensities of speckle patterns $I_1, I_2 \ldots I_N$ formed by the respective optical fibers. Thus, the contrast of speckle is lowered by averaging (unifying).

This will be described with reference to a document (E. G. Rawson, J. W. Goodman, R. E. Norton, J.O.S.A. 70, 968–976, 1980, Appendix).

First, when the spatial mean intensity of speckle patterns from each optical fiber is arbitrary, and the contrast of each speckle is L, the following expression is established.

(numerical expression 15)

$$I = \sum_{k=L}^{N} I_k$$

At this time, the contrast C of speckle produced as a result of superposition, which is expressed by the following expression, and the multiplication Neff ($N_{\mathit{eff}}$) of effective speckle are obtained. The contrast C of speckle is expressed by (numerical expression 16)

$$C = \frac{1}{\sqrt{N_{\mathit{eff}}}}$$

and the ensemble mean intensity of a total sum is obtained as a sum of each ensemble mean intensity like the following expression.

(numerical expression 17)

$$\overline{I} = \sum_{k=L}^{N} \overline{I_k}$$

At this time, variance $\sigma_I^2$ expressed by (numerical expression 18)

-continued $$\sigma_I^2 = \overline{I^2} - (\overline{I})^2$$
$$= \overline{\sum_k I_k \sum_L I_L} - (\sum_k \overline{I_k})(\sum_L \overline{I_L})$$
$$= \sum_k \sum_L (\overline{I_k I_L} - \overline{I_k}\,\overline{I_L})$$

When the correlation coefficient of a k-th speckle and an L-th speckle pattern is $\rho_{kL}$, the following expression is established.

(numerical expression 19)

$$\rho_{kL} = \frac{\overline{I_k I_L} - \overline{I_k}\,\overline{I_L}}{\sqrt{\overline{(I_k - \overline{I_k})^2}\,\overline{(I_L - \overline{I_L})^2}}}$$

Here, from the relation of the assumption of L-th contrast and (numerical expression 20)

$$\sigma^2 = \overline{u^2} - (\overline{u})^2$$

the following expression is obtained.

(numerical expression 21)

$$\overline{I_k^2} = 2(\overline{I_k})^2$$
$$\sqrt{\overline{(I_k - \overline{I_k})^2}} = \sqrt{\overline{I_k^2} - (\overline{I_k})^2} = \overline{I_k}$$
$$\sigma_I^2 = \sum_k \sum_L \rho_{kL} \overline{I_k}\,\overline{I_L}$$

Thus, the contrast of the sum of patterns of all speckles becomes (numerical expression 22)

$$C = \frac{\sigma_I}{\overline{I}} = \frac{\sqrt{\sum_k \sum_L \overline{I_k I_L} \rho_{kL}}}{\sum_k \overline{I_k}}$$

That is, the multiplicity Neff ($N_{\mathit{eff}}$) of effective speckle becomes (numerical expression 23)

$$N_{\mathit{eff}} = \frac{1}{C^2} = \frac{\sum_k \sum_L \overline{I_k I_L}}{\sum_k \sum_L \overline{I_k I_L} \rho_{kL}}$$

Here, if N speckle patterns are incoherent with each other, (numerical expression 24)

$$\rho_{KL} = \begin{Bmatrix} 1 & (k = L) \\ 0 & (\text{others}) \end{Bmatrix}$$

and at this time, (numerical expression 25)

$$N_{\mathit{eff}} = \frac{1}{C^2} = \frac{\sum_k \sum_L \overline{I_k I_L}}{\left(\sum_k \overline{I_k}\right)^2} \xrightarrow[\text{(for any } k,L)]{\overline{I_k} = \overline{I_L}} \frac{N^2}{N} = N$$

is established. That is, if N speckle patterns which are incoherent and have equal intensity are superimposed on each other, the contrast becomes 1/√N.

Fujii et al studied the contrast of speckle produced on an image of a random phase object by spatially partial coherent illumination (see H. Fujii, T. Asakura, opt. Comm. 12, 32–38, 1974).

According to that study, the speckle contrast C is expressed by (numerical expression 26)

$$C = \sqrt{\frac{\begin{array}{l}\iint \Gamma(\chi_1, \chi_2)\Gamma(\chi_3, \chi_4)K(\chi' - \chi_1)K*(\chi' - \chi_2)K(\chi' - \chi_3)K*(x' - \chi_4) \\ x \exp[R(x_1 - x_2) + R(x_3 - x_4)] \\ x\{\exp[-R(x_1 - x_3) - R(x_2 - x_4) + R(x_1 - x_4) + R(x_3 - x_2)] - 1 \\ x dx_1 dx_2 dx_3 dx_4\end{array}}{\iint \Gamma(\chi_1 \cdot \chi_2)K(\chi' - \chi_1)K*(\chi' - \chi^2)\exp[R(\chi_1 - \chi_2)]d\chi_1 d\chi_2}}$$

Here, Γ is the correlation function of the electric field amplitude between two points of the object, K is the amplitude transfer function, and R is the correlation function of the phase of the object.

Concerning a typical numerical value example, when these functions are subjected to a rough calculation in a triangle region, the result as described below is obtained.

That is, the resolution km of the amplitude impulse response of an optical system is made km 1.8 μm, and the spatial coherence length $L_C$ is made $L_C$=15 μm. The roughness of a rough surface of an object is expressed by a correlation length α. When each parameter is changed such that the correlation length α is 0.1 μm, 0.5 μm, 1.0 um, 2.0 um, 5.0 μm, and 10.0 μm, and the contrast of speckle is plotted on the vertical axis, a graph as shown in FIG. 1 is obtained. Here, the horizontal axis $<\phi^2>$ of the graph of FIG. 1 is a root square mean of depth.

That is, in the case where the object has a sufficiently rough surface, $<\phi^2>$ is increased, and α is decreased. It is conceivable that a normal screen has a sufficiently rough surface. From the graph shown in FIG. 1, the contrast of speckle in this calculation example becomes about 0.85.

In recent years, speckle (speckle pattern) has become a serious problem in the field of semiconductor exposure devices, and measures to this have been taken. The background of this is that an excimer laser as a short wavelength light source has been introduced to improve resolution.

In a semiconductor exposure device, as controls of coherence, that is, as measures to the speckle, for example, as shown in FIG. 2, there is proposed a coherence reducing method in which a fly eye lens 71 constituted by elements with different lengths is used, a lens 72 is disposed between an emitting side end of the fly eye lens 71 and a mask 73, and the lens 72 is disposed at a position where the distance f between the lens 72 and the fly eye lens 71 is equal to the distance between the lens 72 and the mask 73 (see Masato Shibuya, Makoto Uehara, "Illumination optical Device", Japanese Patent Publication No. Sho. 60-230629).

However, this method has the problems that the element length of the fly eye lens 71 becomes long, and efficiency is lowered since the sizes of illumination regions from the respective elements are different.

It is also proposed to realize similar effects by using a prism 75 as shown in FIG. 3 (see Japanese Patent Application No. Sho. 63-22131). However, in this method, the effect of coherence reduction is insufficient, and optical losses is high.

In principle, although it is also possible to obtain similar effects by using dispersion by refractive index, there has been a problem that in order to obtain a sufficient effect by a method of using normal dispersion by refractive index, an element becomes huge for coherence reduction.

Other than those, a number of methods of coherence control have been proposed. However, in a display, a microscope, or the like, any method has not been able to sufficiently reduce the speckle produced between an object to be illuminated and the naked eye. Further, in order to remove this speckle, it becomes necessary to carry out greater coherence control than with a projection exposure device such as for lithography.

That is, as shown in FIG. 4, an object 80 illuminated by illuminating light "all forms an image 83 on a screen 82 through a lens 81. Here, in the case where the illuminating light "a" is coherent light, the light receives random phase disturbance through the state of a rough surface of the object 80, the state of an optical surface of the lens 81, and the like, so that the image 83 on the screen 82 exhibits speckle effects.

Further, as schematically shown in FIG. 5, an image of an object formed on a screen through a lens and observed with an eye is equivalent to an image of an object 85 formed on a screen 87 through a lens 86 and formed on a retina 89 through an eyeball 88. That is, in this process, a random phase shift occurs on an optical path by disturbance of light at the screen 87 and the eyeball 88, and speckles are produced in this imaging process as well. Even if the speckles are not superimposed on the image on the screen 87, if there is spatial coherence on an image plane, secondary speckles are produced on the naked eye (retina 89).

A method such as a mirror oscillation or a rotation diffusion plate used in a projection exposure device on the basis of a lithography technique does not reduce the coherence, but merely moves speckles to average them. Thus, even if such a method is used, a remarkable effect on speckle produced on the naked eye is not obtained. In order to apply this method to a display or the like, there is only a method of oscillating a screen so that the positional relation between an object to be illuminated, such as a screen, and an eye is changed (see Eric G. Rawson, Antonio B. Nafarrate, Robert E. Nortone Joseph W. Goodman, "Speckle-free rear-projection screen using two close screens in slow relative motion", Journal of Optical Society of America, Vol. 66, No. 11, November 1976, pp 1290–1294). However, this is extremely inconvenient for practical use.

On the other hand, an optical fiber has been developed for mainly communication usage, and a glass material (glass fiber) containing quartz or the like as its main ingredient has been used for its constituent material. Besides, in order to avoid mode dispersion, the main purpose has been with the development of a single mode optical fiber.

In the-glass fiber, scattering increases in a visible short wavelength range, and its transmissivity is lowered. Thus, the application of an optical fiber to visible light has been restricted to a multi-mode optical fiber bundle (multi-mode fiber bundle) for illumination of a microscope, or the like, in which long transmission is not required. Especially in the case where the multi-mode optical fiber is used, the intensity distribution of emitted light becomes uniform, so that a complicated optical system such as a fly eye lens is not required, which is also a great merit.

In relation to this, recently, a plastic multi-mode optical fiber has been developed, and has attracted attention (see Takaaki Ishigure, Eisuke Nihei, and Yasuhiro Koike, "Graded-index polymer optical fiber for high-speed data communication", Applied Optics, Vol. 33, No.19, 1. July 1994, pp. 4261–4266).

The plastic fiber is inexpensive and lightweight as compared with a glass fiber, and has a feature that it has maximum transmission efficiency in a visible range. Further, multi-mode dispersion is also extremely large as compared with a normal glass fiber.

Besides, in recent years, a hollow waveguide for ultraviolet laser transmission has also been developed (see Preliminary collected papers for 58-th academic lecture at applied physics society, 3a-SR-18, Masaki Tsubokura, Yuichi Hashin, Uichi Kubo, "Improvement of a hollow waveguide for ultraviolet laser power transmission 11).

It has been known that the contrast of speckle is lowered by multi-mode dispersion in multi-mode optical fiber transmission, (see Masaaki Imai, "Fluctuation characteristic of an optical fiber and speckle", Optics, Vol. 8, No. 3, June 1979, p128–134).

That is, as shown in FIG. 6, in a multi-mode optical fiber 92 made of a core 93 and a clad 94, laser light 90 and laser light 91 having different modes have different transmission speeds. Thus, at the side of an emitting end 95 of the multi-mode optical fiber 92, light beams having different mode components from each other come to correspond to light beams incident at different times (t1, t2, and t3). Thus, if the extension due to this mode dispersion is longer than a coherence length, the coherence of the emitted light is reduced.

However, it is difficult to transmit laser light with sufficiently high intensity by only such a multi-mode optical fiber. Even in the case where such fibers are bundled, since laser light emitted from different optical fibers have coherence to each other, it is difficult to control the coherence. That is, to sufficiently reduce the speckle. Further, in order to practically apply this to illumination usage, it becomes necessary to use an optical fiber with high dispersion and high transmissivity in a visible range.

In view of such circumstances, in recent years, there has been proposed a method in which speckle is reduced by using a bundle of optical fibers (bundle fiber) with lengths different from each other by a length not less than a coherent length of an optical source (see D. Kohler, W. L. Seitz, T. R. Loree and S. D. Gardner, "Speckle reduction in pulsed-laser photographs", Optics Communications, 12, pp. 24–28, 1974, Benjamin Dingel and Satoshi Kawata, "Laser-diode microscope with fiber illumination", Optics Communications, 93, pp. 27–32, 1992, B. Dingel, S. Kawata, S. Minami, "Speckle reduction with virtual incoherent laser illumination using a modified fiber array", Optik, 3, 132–3136, 1993). Concerning this, the present applicant also proposed a technique (Japanese Patent Application No. Hei. 10-25646 filed Feb. 6, 1998).

However, including the case where speckle is reduced by using the bundle fiber, in general, in order to sufficiently reduce the contrast of speckle, it is necessary to sufficiently consider the number of divided light beams, the number of light sources, and the like.

For example, the degree at which speckle contrast is recognized by a human eye differs based on ambient brightness, color, differences among individuals, and the like. However, in general, a blur within 10 % on a screen is permissible, and if it is not larger than 5%, it cannot be recognized by a human eye. Although this is different between a moving picture and a still picture, or a monochrome image and a multicolor image, it is roughly a value of such a degree.

SUMMARY OF THE INVENTION

The present invention has been made in view of the foregoing circumstances, and an object thereof is to provide an illuminating method and an illuminating device using, as illuminating light, a light beam in which contrast of speckle is sufficiently reduced by optimizing the number of light sources and the number of divided light beams.

That is, according to an illuminating method (hereinafter referred to as a first illuminating method) of the present invention, in an optical system for forming an image of an object to be illuminated, a light beam emitted from N (N is an integer not less than 1) light source is divided into M light beams (M is an integer not less than 2), a light path length difference of not less than a coherent distance is given to the light beams after division, and then, light axes of these light beams are again aligned with each other to illuminate the object with the light beams of coherence reduced by this, and when the light path length difference from one point on the object to be illuminated to an image corresponding thereto has a standard deviation $\sigma_Z$, the number M and the number N are set so that a relation expressed by the following expression A is satisfied:

(numerical expression 27)  Expression A $$\sqrt{NM} \cdot \sqrt[4]{1 + (2 \cdot W \cdot \sigma_Z)^2} \geq 1$$

(in the expression A, "W" indicates a spectrum width of the wave number of the light beam emitted from the light source).

According to the first illuminating method of the present invention, in the optical system for forming an image of an object to be illuminated, a light beam emitted from N light sources is divided into M light beams, a light path length difference of not less than a coherent distance is given to the light beams after division, and then, light axes of these light beams are again aligned with each other to illuminate the object with the light beams of coherence reduced by this, and when the light path length difference from one point on the object to be illuminated to an image corresponding thereto has a standard deviation $\sigma_Z$, the number M and the number N are set so that relation expressed by the following expression A is satisfied:

(numerical expression 28)  Expression A $$\sqrt{NM} \cdot \sqrt[4]{1 + (2 \cdot W \cdot \sigma_Z)^2} \geq 1$$

Thus, it is possible to reduce the speckle to a range (especially a speckle contrast of 10% or less) which is sufficiently permissible for, for example, a human eye. By this, it is possible to use, as illuminating light, a light beam in which the contrast of speckle is sufficiently reduced.

Incidentally, the standard deviation $\sigma_Z$ of the light path length difference from one point on the object to be illuminated to the image corresponding thereto corresponds to a standard deviation $\sigma_Z$ of the surf ace roughness of a screen on which the image of the object to be illuminated is formed. The width W corresponds to the full width at half maximum of the laser light emitted from the laser source (in the following, the same can be said).

Moreover, as a device for carrying out the first illuminating method with good reproducibility, according to an illuminating device (hereinafter referred to as a first illuminating device) of this invention, in an optical system for forming an image of an object to be illuminated, a light beam emitted from N (N is an integer not less than 1) light sources is divided into M divided light beams (M is an integer not less than 2), a light path length difference of not less than a coherent distance is given to the light beams after division, and then, light axes of these light beams are again aligned with each other to illuminate the object with the coherence of the light beams being reduced by this, and when the light path length difference from one point on the object to be illuminated to an image corresponding thereto has a standard deviation $\sigma_Z$, the number M and the number N are set so that a relation expressed by the following expression A is satisfied:

(numerical expression 29)  Expression A $$\sqrt{NM} \cdot \sqrt[4]{1 + (2 \cdot W \cdot \sigma_Z)^2} \geq 1$$

(in the expression A, "W" indicates a spectrum width of the wave number of the light beam emitted from the light source).

Moreover, according to another illuminating method of this invention (hereinafter referred to as a second illuminating method), in an optical system for forming an image of an object to be illuminated, after light axes of light beams emitted from N' (N' is an integer of 2 or more) light sources are aligned with each other, the coherence of the light beams is reduced, and the object to be illuminated is illuminated with the coherence of the light beams being reduced by this, when a light path length difference from one point on the object to be illuminated to an image corresponding thereto has a standard deviation $\sigma_Z$, the number N' is set so that a relation expressed by the following expression D is satisfied:

(numerical expression 30)  Expression D $$\sqrt{N'} \cdot \sqrt[4]{1 + (2 \cdot W \cdot \sigma_Z)^2} \geq 1$$

(in the expression D, "W" indicates a spectrum width of the wave number of the light beam emitted from the light source).

According to the second illuminating method, in the optical system for forming an image of an object to be illuminated, after light axes of light beams emitted from N' light sources are aligned with each other, the coherence of the light beams is reduced, and the object to be illuminated is illuminated with the light beams of coherence reduced by this, and when the light path length difference from one point on the object to be illuminated to an image corresponding thereto has a standard deviation $\sigma_Z$, the number N' is set so that a relation expressed by the following expression D is satisfied:

(numerical expression 31)  Expression D $$\sqrt{N'} \cdot \sqrt[4]{1 + (2 \cdot W \cdot \sigma_Z)^2} \geq 1$$

Thus it is possible to reduce the speckle to a range (especially wherein the speckle contrast is 10% or less)

which is sufficiently permissible for, for example, a human eye. By this, it is possible to use, as illuminating light, an optical beam in which the contrast of speckle is sufficiently reduced.

Moreover, as a device for carrying out the second illuminating method with good reproducibility, according to an illuminating device (hereinafter referred to as a second illuminating device) of this invention, in an optical system for forming an image of an object to be illuminated, after light axes of light beams emitted from N' (N' is an integer of 2 or more) light sources are aligned-with each other, the coherence of the light beams is reduced, and the object to be illuminated is illuminated with the light beams of coherence reduced by this, and when the light path length difference from one point on the object to be illuminated to an image corresponding thereto has a standard deviation $\sigma_Z$, the number N' is set so that a relation expressed by the following expression D is satisfied:

(numerical expression 32)      Expression D $$\sqrt{N'} \cdot \sqrt[4]{1 + (2 \cdot W \cdot \sigma_Z)^2} \geq 1$$

(in the expression D, "W" indicates a spectrum width of wave number of the light beam emitted from the light source).

BRIEF DESCRIPTION OF THE DRAWINGS

FIG. 6 is a schematic view showing the principle of coherence reduction by mode dispersion in an optical fiber.

FIGS. 7A and 7B are schematic views showing a fiber bundle usable for the first embodiment.

DETAILED DESCRIPTION OF THE PREFERRED EMBODIMENTS

Figure 1:
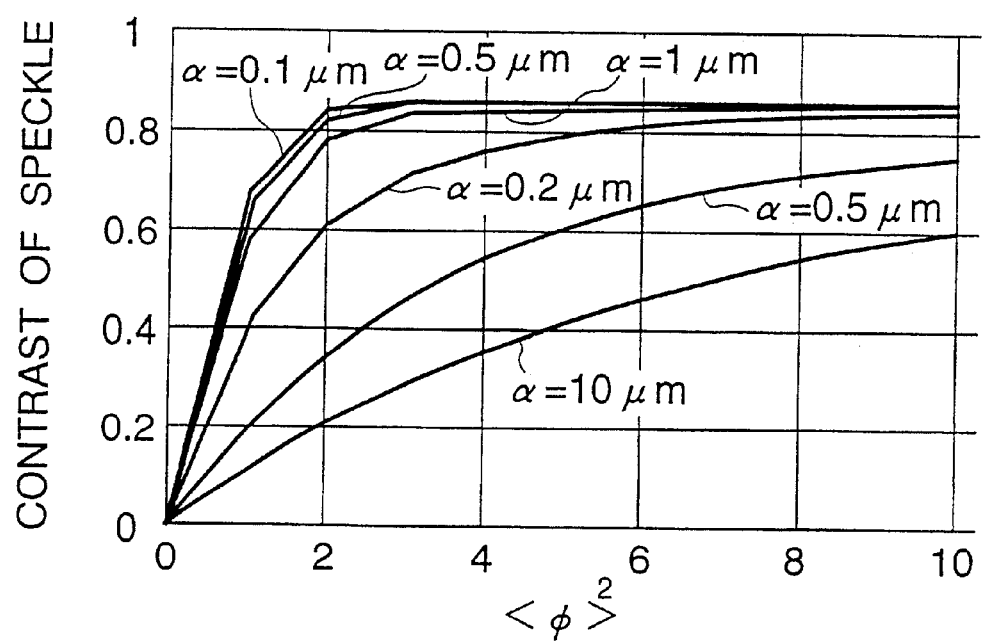
FIG. 1 is a graph showing the change of speckle contrast due to the surface roughness of an object.

First, the operation of the first illuminating method and the second illuminating method will be described.

In the present invention, for example, in an image display device, a measuring device, or a microscope, especially as light beams, when the center wavelength of the light beam emitted from N light sources having almost the same wavelength is $\lambda_0$, the full width at half maximum of a wavelength spectrum is $\Delta\lambda$, the spectrum width of wave number is W, and the spectrum of the wave number is S(k), the following expression B and expression C are established.

(numerical expression 13)      Expression B $$W = -\frac{\pi}{\sqrt{2}} \cdot \frac{\Delta k}{\lambda_0^2}$$

Expression C $$S(k) = \frac{\mathrm{Exp}\left[-\frac{(k - k_0)^2}{2 \cdot W^2}\right]}{\sqrt{2\pi} \cdot W}$$

Further, in an optical system in which light from each of the light sources is divided into M light beams, a light path length difference not less than a coherent distance is given to each of the light beams, and then, they are again combined (alternatively, the coherence of the light beam is reduced without dividing the light emitted from each of the light sources) to obtain light beams of reduced coherence, so that an object is illuminated with the light beams of reduced coherence to form an image of the object, when the light path length difference from one point on the object to a point on an image corresponding thereto has a fluctuation of standard deviation of $\sigma_Z$, the following relation is satisfied:

(numerical expression 34)      Expression A $$\sqrt{NM} \cdot \sqrt[4]{1 + (2 \cdot W \cdot \sigma_Z)^2} \geq 1$$

As the light source, it is desirable to use a semiconductor laser, a solid-state laser, harmonics thereof, and laser light after a nonlinear wavelength conversion process such as produces the sum of frequencies or difference of frequencies. As to the wavelength of laser light, laser light is not limited to only a visible range, but laser light in an ultraviolet range or infrared range may be used. Even in the case where the number of light sources is one (N=1) or in the case where wave division is not carried out (M=1), it is satisfactory if the foregoing expression A is satisfied. Especially as means forgiving the light path length difference, it is desirable to use an optical fiber.

That is, light from N light sources is divided into M light beams, and after a light path length difference not less than a coherent length is given to the light beams, if all light beams are combined, since each component is incoherent, the sum of intensity of N×M speckle patterns is observed. Thus, the speckle contrast becomes (numerical expression 35)

$$\frac{1}{\sqrt{NM}}$$

When the center wavelength of the light beams of the light source is $\lambda_0$, the full width at half maximum of the wavelength spectrum is $\Delta\lambda$, the spectrum width of the wave number is W, and the spectrum of the wave number is S(k), that is, (numerical expression 13)

$$W = -\frac{\pi}{\sqrt{2}} \cdot \frac{\Delta k}{\lambda_0^2}$$

$$S(k) = \frac{\text{Exp}\left[-\frac{(k-k_0)^2}{2 \cdot W^2}\right]}{\sqrt{2\pi} \cdot W}$$

and when the standard deviation of the speckle intensity to the mean value <I> of illumination intensity is $\sigma_I$, the speckle contrast is expressed by (numerical expression 34)

$$\frac{\sigma_I}{\langle I \rangle} = \frac{1}{\sqrt[4]{1+(2 \cdot W \cdot \sigma_Z)^2}}$$

If the wavelength width of the laser light emitted from the light source is widened, the speckle contrast is reduced. When the speckle contrast of an imaging system is $C_I$, the speckle contrast C of all systems is finally given by the following expression.

(numerical expression 38)

$$C = \frac{C_I}{\sqrt{NM} \cdot \sqrt[4]{1+(2 \cdot W \cdot \sigma_Z)^2}}$$

When this light beam is used as illuminating light, image deterioration by speckle can be avoided, and it is possible to realize a display, a measuring device, an exposure device, and the like. However, at this time, especially like the case of the laser display, from the viewpoint of visibility of a human eye, it becomes an object that the speckle contrast C is 0.1 or less. If the contrast $C_I$ is 0.1 or less, it is not necessary to bother to reduce the speckle. Thus, it is assumed that the contrast $C_I$ is typically 0.1 or more ($C_I \geq 0.1$).

Besides, it is desirable that the contrast of the finally observed speckle is 0.1 or less ($C \leq 0.1$). Thus, on the basis of the previous expression, the following expression A is established.

(numerical expression 34)      Expression A $$\sqrt{NM} \cdot \sqrt[4]{1+(2 \cdot W \cdot \sigma_Z)^2} \geq 1$$

This is a condition where the contrast of speckle becomes 10% or less, which is a permissible degree when a person observes an image.

Especially in the case where a demand for the contrast of speckle is severe, such as in a still picture, it is desirable that the contrast C is 5% or less. In this case, it is satisfactory if the following equation is satisfied.

(numerical expression 40)      Expression A′

$$\sqrt{NM} \cdot \sqrt[4]{1+(2 \cdot W \cdot \sigma_Z)^2} \geq 2$$

Although the permissible range of the speckle contrast is changed when the field of application becomes different, it is conceivable that the speckle contrast (10% or less, further, 5% or less) required for a display device such as a laser display has the most severe value. If the contrast is within the foregoing range, the light can be sufficiently used for a measuring device, an exposure device, a microscope, or the like.

In the present invention, if the foregoing conditions are satisfied, it is satisfactory if the number of light sources and the number of divisions (number of divided waves) is 1 or more. That is, in the first illuminating method and illuminating device of this invention, such a case is considered that the number N of light sources is 1 or more, and the number M of divided beams is 2 or more. Besides, in the second illuminating method and illuminating device of this invention, such a case is intended that the number N of light sources is 2 or more, and the number M of divided beams is 1.

As the optical source, it is advantageous in view of application to use a semiconductor laser which can be easily handled, a solid-state laser, and wavelength conversion light due to the nonlinear optical effect. Particularly, since the semiconductor laser has a wide oscillation wavelength width, the spectrum width W of the wave number is large. Thus, the number of lasers or the number of divided waves can be lessened, so that the optical system becomes simple.

It is also possible to use ultraviolet light by wavelength conversion of an excimer laser or solid-state laser as the optical source. Since the illuminating device using such short wavelength laser light has high resolution capability, it is especially suitable for an exposure device.

Figure 2:
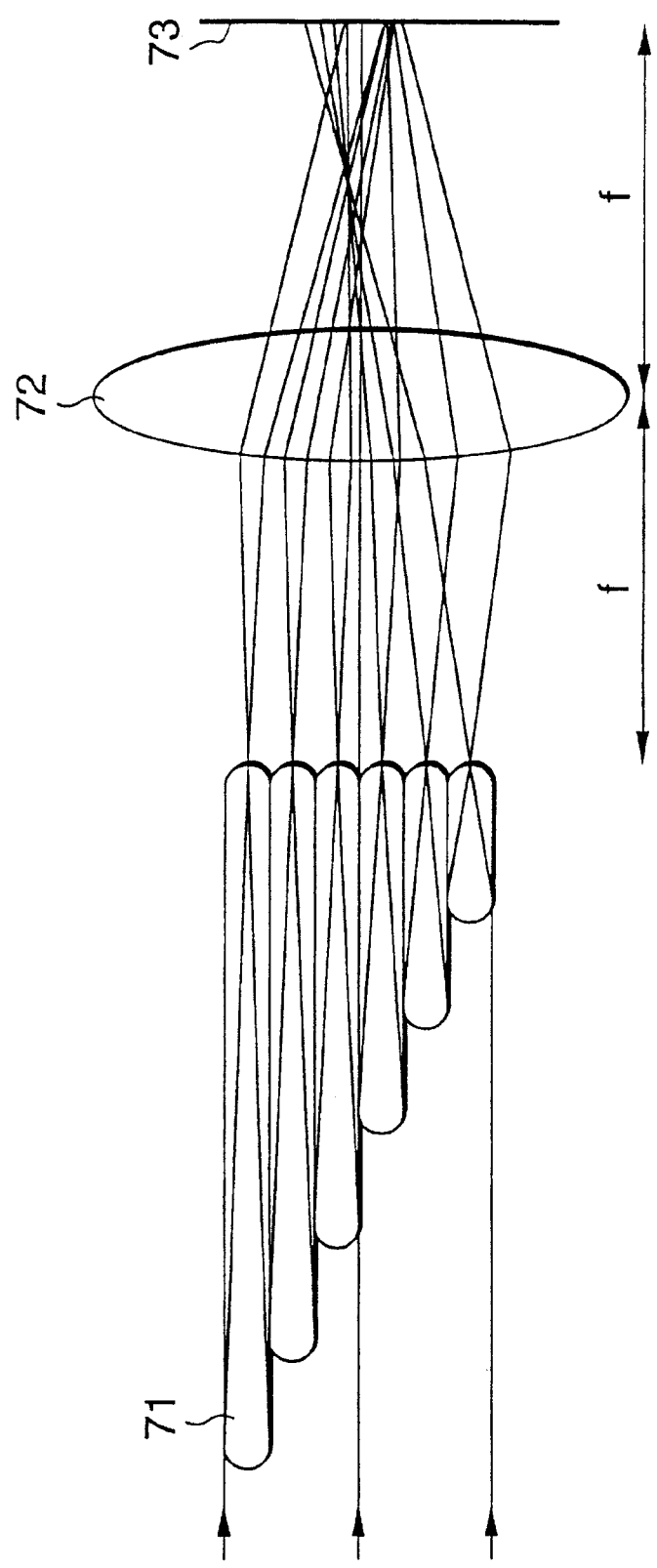
FIG. 2 is a partial schematic view showing an illuminating device using a conventional fly eye lens.
Figure 3:
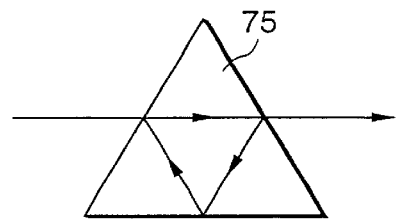
FIG. 3 is a partial schematic structural view showing an illuminating device using a conventional prism.
Figure 4:
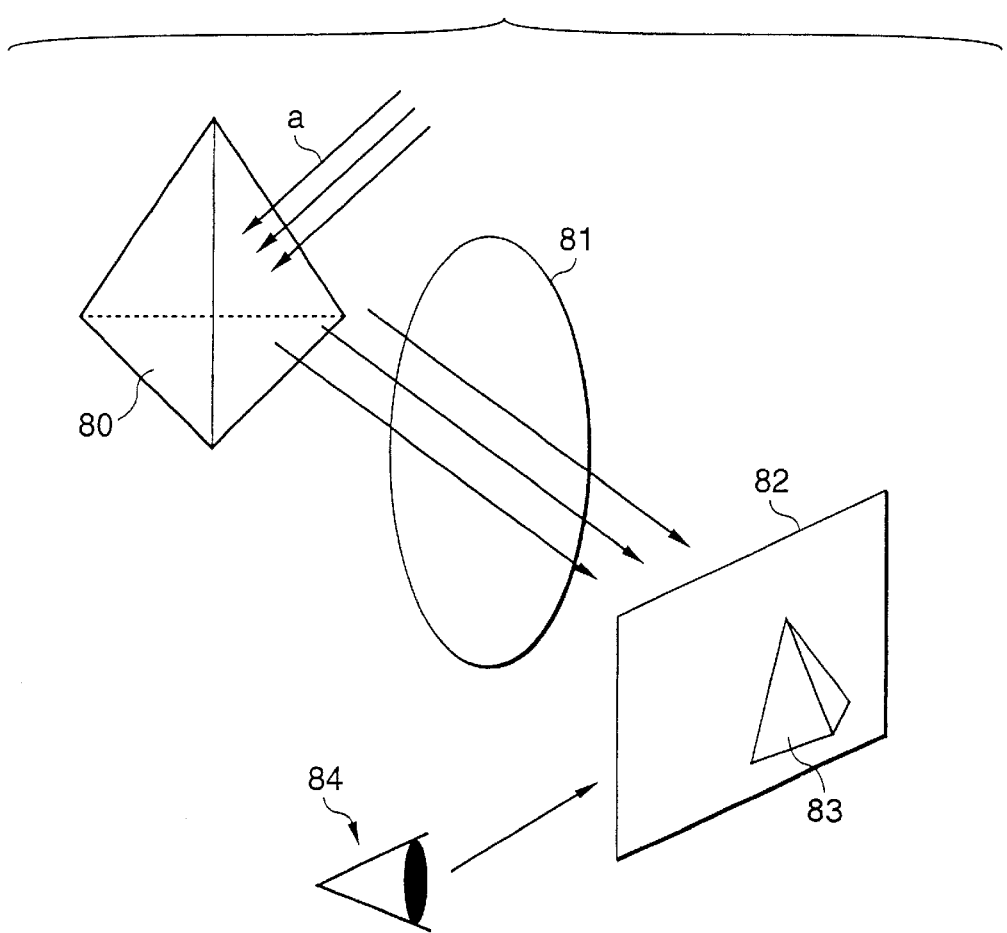
FIG. 4 is a schematic view for explaining the necessity of speckle control.
Figure 5:
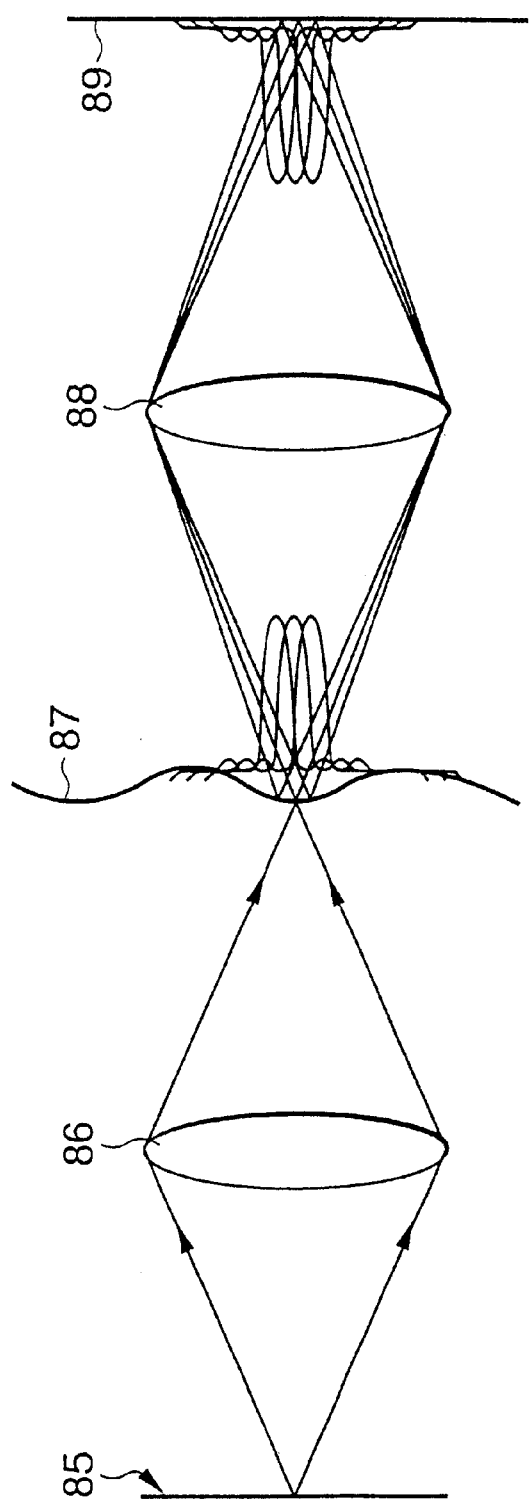
FIG. 5 is another schematic view for explaining the necessity of speckle control.

Further, as the means for giving a difference to the light path length, it is preferred to use a bundle of optical fibers with changed lengths. Other than that, means such as the foregoing prism (see FIG. 3) or fly eye lens (see FIG. 2) may be used.

Incidentally, it is naturally possible to apply the illuminating device of this invention to not only a display but also a microscope or a measuring device, and further to an exposure device or the like.

Next, the first illuminating method and the first illuminating device of this invention will be described in more detail.

In the first illuminating method and the first illuminating device of this invention, concerning the light beam emitted from the light source, when the center wavelength of the light beam is $\lambda_0$, the full width at half maximum of the wavelength spectrum is $\Delta\lambda$, the spectrum width of the wave number is W, and the spectrum of the wave number is S(k), it is desirable that the following expressions B and C are satisfied.

(numerical expression 13)      Expression B $$W = -\frac{\pi}{\sqrt{2}} \cdot \frac{\Delta k}{\lambda_0^2}$$

Expression C $$S(k) = \frac{\text{Exp}\left[-\frac{(k-k_0)^2}{2 \cdot W^2}\right]}{\sqrt{2\pi} \cdot W}$$

Moreover, it is desirable that the number M and the number N are set so that the relation expressed by the following expression A' is satisfied.

(numerical expression 40)      Expression A'

$$\sqrt{NM} \cdot \sqrt[4]{1 + (2 \cdot W \cdot \sigma_Z)^2} \geq 2$$

By making the setting in such a manner, it is possible to suppress the speckle contrast to 5% or less.

Besides, it is desirable that in order to give the light path length difference as the coherent distance or more to the light beams after division, the light beams emitted from the light source are made incident on an optical fiber group of a plurality of bundled optical fibers which have lengths different from each other by the coherent distance or more. It is desirable to use a multi-mode optical fiber for the optical fiber.

In general, in the coherent light beam transmitting through the multi-mode optical fiber, its coherence is reduced by mode dispersion. Further, since the lengths of the plurality of optical fibers are different from each other by a length not less than the coherent length, the optical beams emitted from the respective optical fibers do not have coherence with each other.

Thus, the size (spectrum) of the light source is regarded as widened, and spatial coherence is reduced. The coherence of light beams after combination is reduced, and when the coherence is reduced, the contrast of speckle is reduced. Further, when this light is used as illuminating light, a display, a measuring device, an exposure device, and the like can be realized without deterioration of an image by speckle. Further, since the intensity distribution of the emitted light beam from the multi-mode optical fiber is uniform, uniform and high intensity illumination can be realized at the same time as the reduction of coherence.

Hereinafter, mode dispersion in the multi-mode fiber will be described in detail.

In the case of a step index fiber composed of a core with a high refractive index and a clad with a lower refractive index, the total number N of confinement modes is given by the following expression (1).

$$N \approx V^2/2 \qquad \text{expression (1)}$$

Where, in the expression (1), V is a normalized frequency expressed by the following expression (2).

$$V = k_0 a (n_1^2 - n_2^2)^{1/2} \qquad \text{expression (2)}$$

In the expression (2), $k_0$ is the wave number in vacuum (=ω/c: ω is the angular frequency, c is the light speed), $n_1$ is a core refractive index, $n_2$ is a clad refractive index, and "a" is a core diameter.

For example, when an optical beam of wavelength 500 nm is made incident on a plastic fiber with a core diameter "a" of 500 μm, a core refractive index $n_1$=1.492, and a clad refractive index $n_2$=1.456, the number N of total confinement modes becomes about 500,000. That is, in the multi-mode fiber, a pulse is greatly widened by mode dispersion. In the case of such a multi-mode fiber, it is conceivable that the mode refractive index extends from the core refractive index to the clad refractive index.

Thus, the distance between the top and the rear of a pulse passing through an optical fiber with a length L is expressed by the following expression (3).

$$c\{(n_1L/c)-(N_2L/c)\}=(n_1-n_2)L \qquad \text{expression (3)}$$

As a result, when a light beam (δ function-like pulse incident at the same time) of wavelength 500 nm incident on a light incident side of an optical fiber at the same time is emitted from, for example, the optical fiber with a length of 1 m, it is widened to a pulse width of 2.6 cm between the front and the rear.

Like this, when the coherence length of the light beam incident on the optical fiber is shorter than the pulse width, even if the incident light is continuous light, the coherence is reduced. For example, if laser light of a solid laser capable of oscillating at multi-mode, or its harmonics is used, a coherence length of about several mm can be realized. Thus, time coherence of the optical beam transmitting through the multi-mode optical fiber is reduced.

Besides, also in space, spatial coherence is reduced by superimposition of many modes. By this influence, as described above, even if the mode dispersion length (difference between the fastest mode and the slowest mode at the light emitting end of the optical fiber) of the optical fiber is shorter than the coherence length of the light source, the coherence is reduced. However, in order to suppress the coherence more effectively, it is desirable that the mode dispersion length of the optical fiber is longer than the coherence length of the optical source. For that purpose, it is satisfactory if the length L of the fiber is $$L > (a/n_1 - n_2)$$

(where, "a", $n_1$ and $n_2$ are the same as those described before).

When the coherence length of the optical beam transmitting through the multi-mode optical fiber is made "m", if the difference between lengths of the plurality of bundled optical fibers is "m" or more, the optical beams emitted from the plurality of optical fibers do not have coherence with each other. Thus, when these are mixed (combined), the coherence of the light beams is reduced and the speckle becomes hard to produce. Thus, when the length of an optical fiber, the number of fibers, and the coherence length of a light source are suitably selected and designed, speckle can be sufficiently suppressed.

Here, it may be necessary to pay attention to a loss in light intensity during transmission. However, at present, in the case of a plastic fiber, its transmission loss is about 0.1 dB/m to a light beam of wavelength 500 nm to 550 nm and is minimum. That is, for the length of 1 m, 5 m, 10 m, and 50 m, an internal transmissivity becomes 97.7%, 89.1%, 79.4%, and 31.6%, respectively. Thus, the illuminating method of this invention attains a sufficiently permissible degree for application usage of the device (for example, a display device, a measuring device, a microscope, an exposure device, etc.).

Although the transmissivity of the hollow optical fiber for guiding ultraviolet rays is relatively low at present, it is expressed that sufficient transmission efficiency will be obtained in the future. Besides, it is conceivable that by improvement of output of various lasers themselves as well, sufficient emitted light can be obtained according to an application use.

Besides, in the first illuminating method and the first illuminating device of this invention, the light beam emitted from the light source is laser light in a visible light wavelength region, and it is possible to illuminate a film or a spatial modulator as an object to be illuminated. However, for example, it is also possible to use laser light in an ultraviolet light wavelength region and to apply this invention to an illuminating light source for an exposure device using the short wavelength laser light.

It is desirable that the light beam is laser light emitted from a semiconductor laser or laser light by nonlinear wavelength conversion of laser light emitted from a solid-state laser (for example, Nd: YAG, etc.). However, any other laser light source (or its harmonics), such as a gas laser or dye laser, may be suitably used.

Moreover, in the first illuminating method and the first illuminating device of this invention, the number of light sources is made one, and a light beam emitted from this light source can be divided into plural beams. That is, it is desirable to make N=1 and M≧2. Moreover, it is further desirable that the number of light sources is made plural, and a light beam emitted from each of these light sources is divided into plural beams. That is, it is further desirable to make N≧2 and M≧2.

Especially, in order to reduce the contrast of speckle to about 10%, it is desirable that M or N is made 100 or more. Incidentally, although the number M or N may be 100 or more, it is satisfactory if M×N is 100 or more. Further, in order to reduce the contrast of speckle to about 5%, it is desirable that M or N is made 400 or more. In this case as well, although each of M or N may be 400 or more, it is satisfactory if the number of M×N is 400 or more.

In the first illuminating method and the first illuminating device of this invention, it is desirable that a light beam of reduced coherence is used as an illuminating light beam for a display device, a measuring device, a microscope, or an exposure device. That is, a light beam of reduced coherence can be used for various illumination uses.

Next, the second illuminating method and the second illuminating device of this invention will be descried in detail.

In the second illuminating method and the second illuminating device of this invention, concerning a light beam emitted from a light source, when the center wavelength of the light beam is $\lambda_0$, the full width at half maximum of a wavelength spectrum is $\Delta\lambda$, the spectrum width of wave number is W, and the spectrum of the wave number is S(k), it is desirable that the following expressions B and C are established.

(numerical expression 13) Expression B $$W = -\frac{\pi}{\sqrt{2}} \cdot \frac{\Delta k}{\lambda_0^2}$$

$$S(k) = \frac{\mathrm{Exp}\left[-\frac{(k-k_0)^2}{2 \cdot W^2}\right]}{\sqrt{2\pi} \cdot W}$$

Expression C

Moreover, it is desirable that the number N' is set so that the relation expressed by the following expression D' is satisfied.

(numerical expression 44) Expression D'

$$\sqrt{N'} \cdot \sqrt[4]{1 + (2 \cdot W \cdot \sigma_Z)^2} \geq 2$$

By making the setting in such a manner, it is possible to suppress the contrast of speckle to 5% or less.

Besides, it is desirable to make an optical beam, which is emitted from the light source, of laser light in a visible light wavelength range, and to illuminate a film or a spatial demodulator as an object to be illuminated. However, it is also possible to use, for example, laser light in an ultraviolet light wavelength range, and to use it as an illuminating light source of an exposure device using short wavelength laser light.

Besides, it is desirable that the light beam is laser light emitted from a semiconductor laser or laser light by nonlinear wavelength conversion of laser light emitted from a solid-state laser. However, any other laser light source, such as gas laser or a dye laser, may be suitably used.

From the viewpoint that the contrast of speckle is suppressed to 10% or less, it is desirable that N' is made 100 or more. From the viewpoint that the contrast of speckle is suppressed to 5% or less, it is desirable that N' is made 400 or more.

Further, in the second illuminating method and the second illuminating device of this invention, it is desirable that a light beam of reduced coherence is used as an illuminating light beam for a display device, a measuring device, a microscope, or an exposure device. That is, as a light beam of reduced coherence, it can be used for various illumination uses.

In the following, preferred embodiments of this invention will be described.

First embodiment (case where a fiber bundle is used):

First, description will be made on a case where a plurality of optical fibers with different lengths are used, and a light path length difference is given to laser light emitted from one light source (N=1, M≧2).

As shown in FIG. 7A, all of the incident ends (incident side fiber bundle portion) 3 and the emitting ends (emitting side fiber bundle portion) 4 of a plurality of multi-mode optical fibers 2a, 2b, 2c, 2d . . . having lengths different from each other by a coherence length or more of a light beam incident on each of the optical fibers are arranged, and these are bundled, so that a fiber bundle 1 composed of the optical fiber group is constructed.

It is desirable that the way of bundling especially the incident side fiber bundle portion 3 and the emitting side fiber bundle portion 4 is made, as shown in FIG. 7B, as close as possible in view of coupling efficiency of emitted (or incident) laser light. When symmetry is taken into consideration, it is most advantageous to take an arrangement forming an equilateral hexagon, or a hexagonal close-packed structure in crystal structure.

Each of the multi-mode optical fibers 2 has a double structure made of a core 5 with a large refractive index and a clad 6 with a relatively small refractive index, and the lengths of the fibers in the fiber bundle 1 are different from each other. It is satisfactory if the difference of lengths is not less than the coherence length of coherent light incident on the fiber bundle 1, and the difference of the lengths of at least two optical fibers is not less than the coherence length. However, it is desirable that the lengths of all the bundled optical fibers are different from each other by not less than the coherence length.

As a method of bundling a plurality of optical fibers with different lengths, as shown in FIG. 7A, some of the respective fibers may be folded in a curved state so that they become longer than the other fibers by a length not less than the coherence length. Even if this folded portion 8 is provided, the light incident portion and light emitting portion of the fiber bundle 1 are common or are located at the same position to the respective fibers. When the optical fibers are used like this, the surrounding space is effectively used by folding or the like so that the foregoing difference in length can be easily and compactly realized. The shape of a fiber is not limited to that shown in FIG. 7A, but can be formed into an arbitrary shape by using the size of a curvature of an optical fiber.

Thus, in the fiber bundle 1 shown in FIG. 7A, coherent laser light α incident on the incident side fiber bundle portion 3 at which the plurality of optical fibers are bundled is divided through the fiber bundle 1, and is emitted from the emitting end 4 as optical beams of reduced coherence, ideally, as incoherent light beams.

That is, the laser light a incident on the incident side fiber bundle portion 3 is incident on each of the multi-mode optical fibers 2a, 2b, 2c, 2d . . . while having the same or substantially the same intensity, and is emitted as laser light beams (a), (b), (c), (d) . . . in which time coherence and spatial coherence are reduced by mode dispersion in each of the multi-mode optical fibers.

Since the lengths of the multi-mode optical fibers are different from each other by not less than the coherence length, the laser light beams (a), (b), (c), (d) . . . emitted from the emitting side fiber bundle portion 4 of the respective multi-mode optical fibers have phase differences each corresponding to a difference of length not less than the coherence length. The laser light beams emitted from the respective optical fibers are not coherent to each other, and a combination of these laser light beams produces a light beam which has high intensity and is excellent in directionality, and at the same time, has reduced coherence and is substantially incoherent.

Thus, the coherent laser light is transmitted through the bundle fiber with the foregoing simple structure, and is converted into a substantially incoherent light beam, and especially, can be used as illuminating light for a display, a measuring device, a microscope, an exposure device, or the like. Since the coherence is reduced through the optical fiber (fiber bundle), the coherence reduction effect is sufficient, the intensity distribution is uniform, and the optical loss is low.

Figure 8:
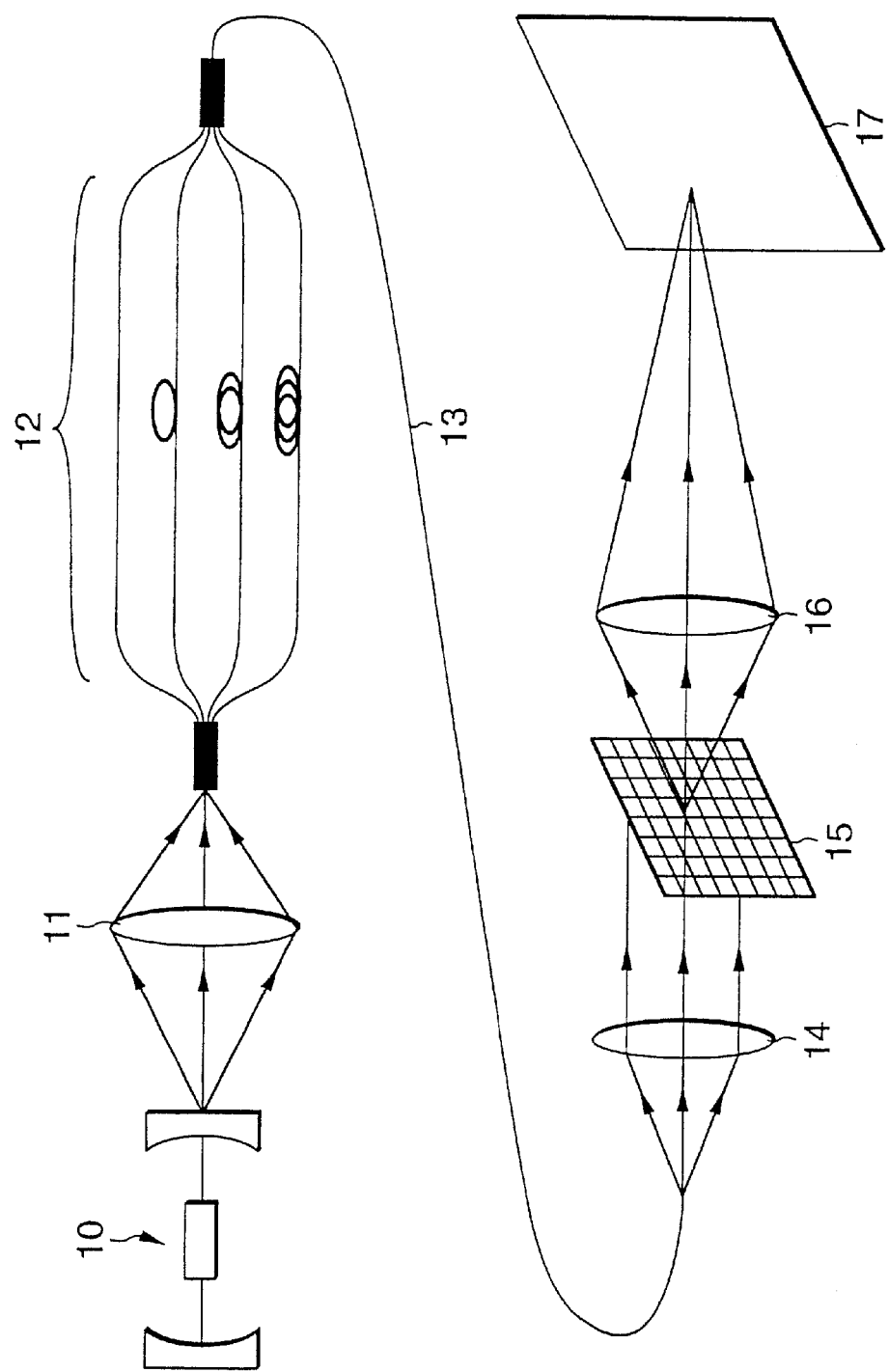
FIG. 8 is a schematic structural view showing an illuminating device according to a first embodiment of this invention.

Next, a display device (laser display) using the fiber bundle shown in FIGS. 7A and 7B will be shown in FIG. 8.

In the display device shown in FIG. 8, first, laser light emitted from a laser resonator 10 is incident on a lens 11. Next, the laser light condensed by the lens 11 is incident on an incident side fiber bundle portion of a bundle fiber 12 similar to the above.

The laser light emitted through the bundle fiber 12 and an optical fiber 13 illuminates, for example, a spatial modulator (transmission type light valve) made of a transmission type liquid crystal display element through a lens 14. Incidentally, the optical fiber 13 may be the fiber bundle 12 or may be another optical fiber coupled with the fiber bundle 12.

By illuminating light of high intensity from the lens 14, an image by the spatial modulator 15 is projected with high brightness, high fineness, and excellent contrast on a screen 17 through a projection lens 16.

Like this, the coherence of the illuminating light for illuminating the spatial modulator 15 is reduced by the effect described before, so that speckles are reduced on both the screen and the retina of an observer observing this.

Here, as the laser resonator 10, a solid-state laser, a semiconductor laser, a gas laser, a dye laser, or the like may be used, or harmonics of these (for example, second harmonic or fifth harmonic of Nd: YAG laser) may be used. In order to obtain light of three primary colors, a light source such as an LED or a lamp other than the laser can also be used in addition to the laser. Further, it is not necessary that the number of light sources is one, but a plurality of light sources may be used. By this, it becomes possible to use a semiconductor laser which has a low output, but has high efficiency and is easily handled. In that case, when the plurality of laser light beams are combined, a fiber bundle as shown in FIGS. 7A and 7B may be used.

(Second embodiment)

For the purpose of obtaining illuminating light of three primary colors used for a display device or the like, this embodiment shows the structure of a light source portion of illuminating light beams, which uses a semiconductor laser capable of oscillating laser light in a red wavelength region, a semiconductor laser capable of oscillating laser light in a green wavelength region, and a semiconductor laser capable of oscillating laser light in a blue wavelength region.

Figure 9:
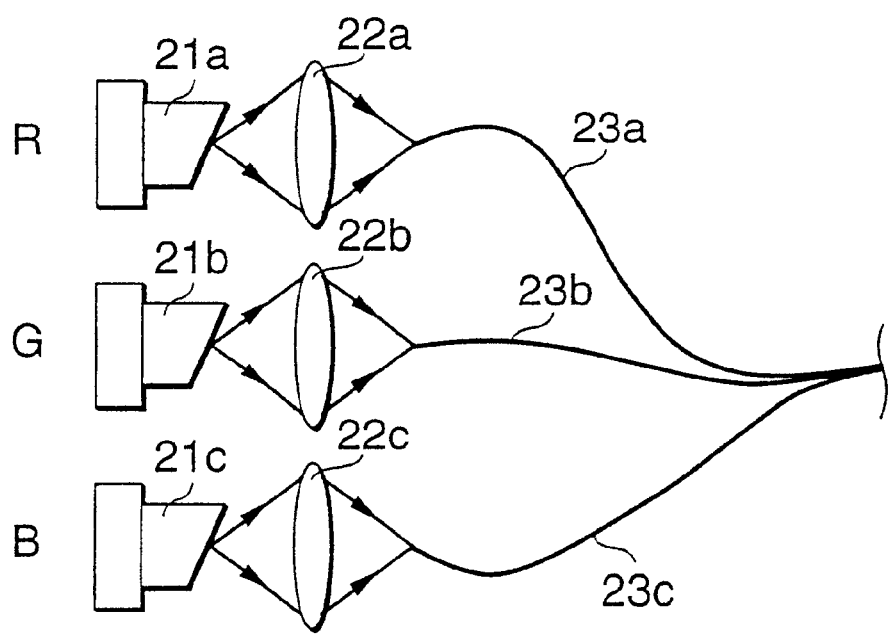
FIG. 9 is a schematic structural view showing the vicinity of a light source of an illuminating device according to a second embodiment.

That is, as shown in FIG. 9, laser light emitted from each of a semiconductor laser 21a for red (R) oscillation, a semiconductor laser 21b for green (G) oscillation, and a semiconductor laser 21c for blue (B) oscillation is guided through lenses 22a, 22b, and 22c to fiber bundles 23a, 23b, and 23c according to the present invention, and the laser light of each color can be coupled through the fiber bundles (N=1, M≧2).

Like this, for the purpose of obtaining the three primary colors, the semiconductor lasers of red, green, and blue oscillation are used, and the emitted light beam from each of the semiconductor lasers is guided through the fiber bundle. As a result, the light beam can be used as illuminating light in which its coherence is reduced and at the same time, the directionality is high and the intensity is high.

Figure 10:
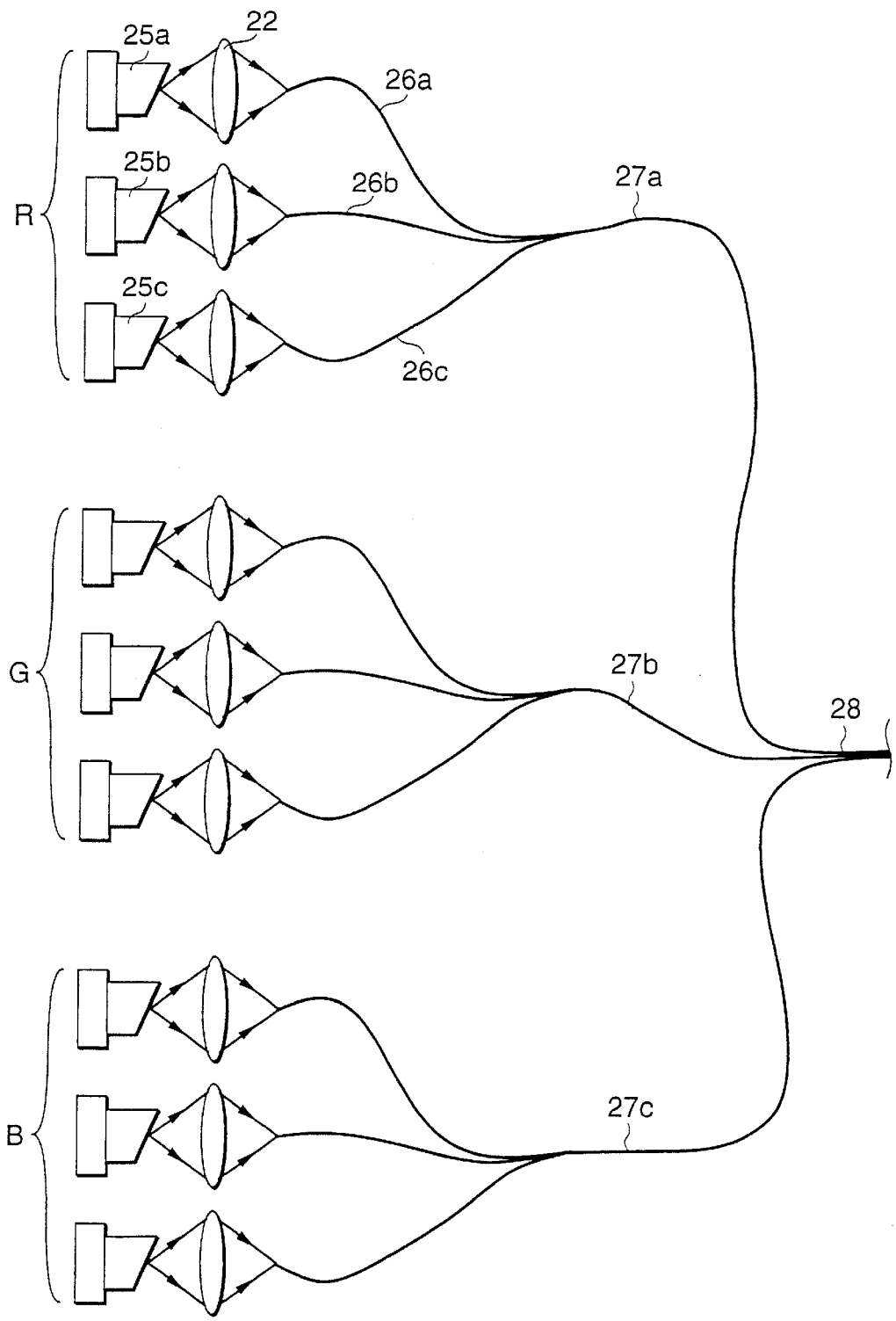
FIG. 10 is a schematic structural view showing the vicinity of another light source of the illuminating device according to the second embodiment.

FIG. 10 shows an illuminating device which is based on this embodiment and has an object to obtain illuminating light with higher intensity and reduced coherence (N=3, M≧2).

As shown in FIG. 10, red laser light beams from red semiconductor lasers 25a, 25b and 25c are guided through lenses 22 to fiber bundles 26a, 26b, and 26c, respectively, and these fiber bundles are further coupled, so that red laser light with higher intensity can be transmitted through a fiber bundle 27a. It is needless to say that green laser light and blue laser light can be transmitted in the same way.

The fiber 27a for transmitting the red laser light, a fiber 27b for transmitting the green laser light, and a fiber 27c for transmitting the blue laser light are further bundled, so that laser light of three primary colors with higher intensity can be transmitted through a fiber 28. Of course, the number of semiconductor lasers oscillating in each color is not limited to three, but any number of semiconductor lasers may be used. A fiber bundle with a folded portion is not limited to the positions of the fiber bundles 26a, 26b, and 26c, but may be positioned at the fibers 27a, 27b, and 27c or the fiber 28.

(Third embodiment)

This embodiment shows the structure of a light source portion of illuminating light beams using laser light beams of different polarized states.

Figure 11:
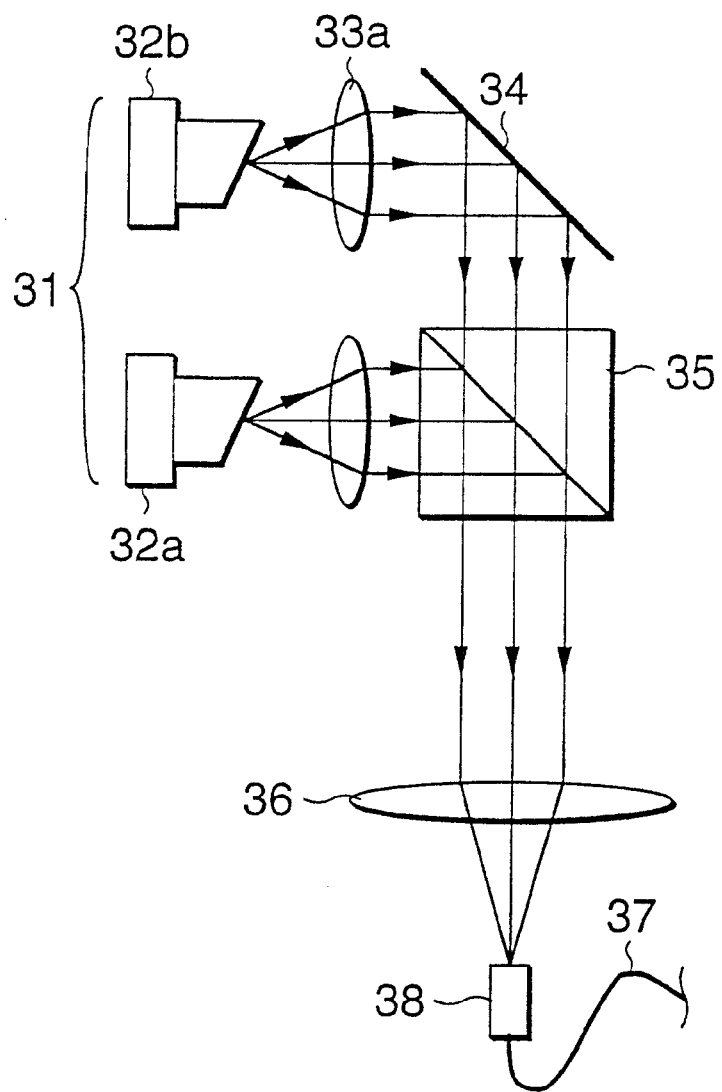
FIG. 11 is a schematic structural view showing the vicinity of a light source of an illuminating device according to a third embodiment.

FIG. 11 is a main portion schematic view showing the structure of a light source in which a laser coupler unit 31 composed of a semiconductor laser 32a for oscillating P-polarized light, a semiconductor laser 32b for oscillating S-polarized light, lenses 33a and 33b, a mirror 34, and a polarization beam splitter 35, and a lens 36 are used to combine the laser light of the P-polarized light and the laser light of the S-polarized light in a fiber bundle 37. When the polarized beam splitter is used like this, laser light with high intensity can be effectively guided (N=2, M≧2).

Figure 12:
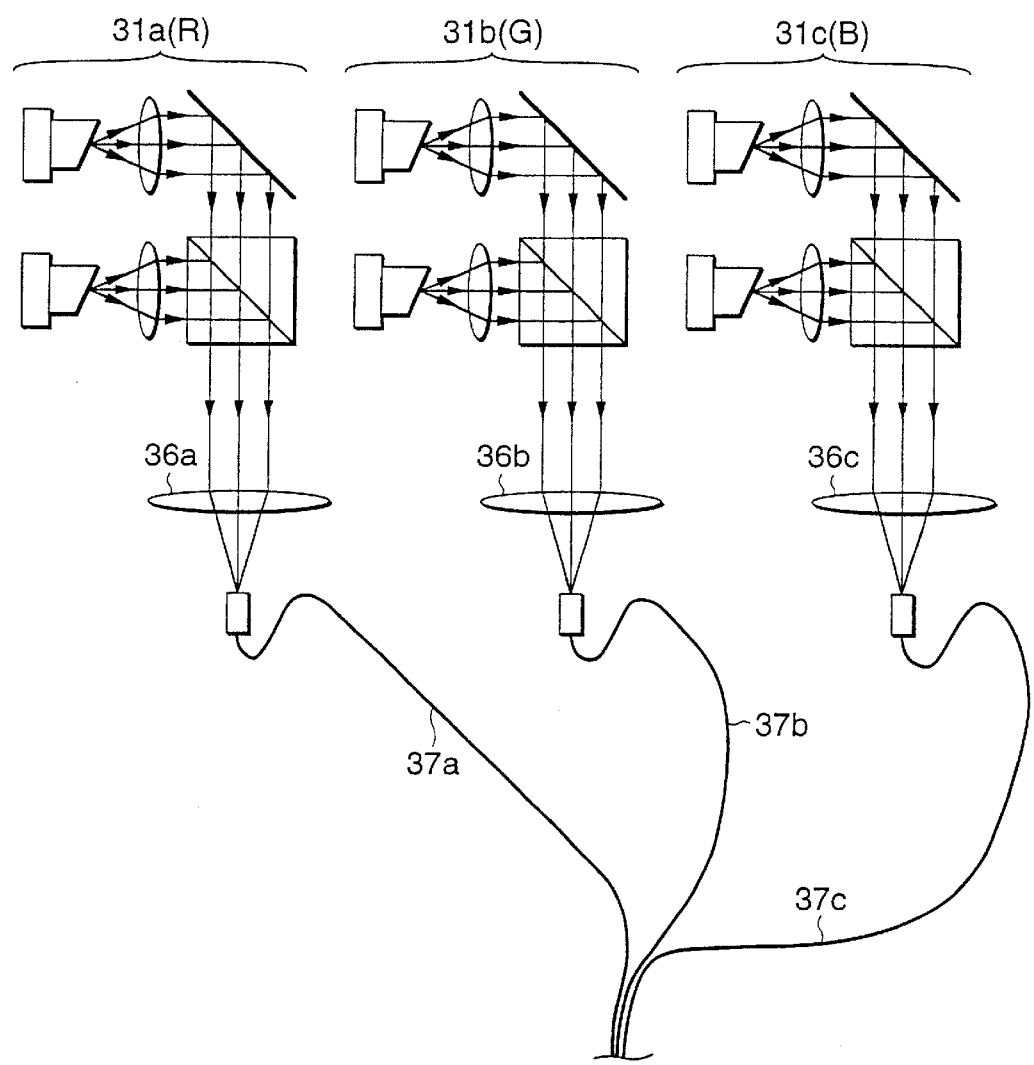
FIG. 12 is a schematic structural view showing the vicinity of another light source of the illuminating device according to the second embodiment.

FIG. 12 shows an illuminating device using laser light beams with different polarized states, which is basically similar to FIG. 11. Red laser light beams emitted from a laser coupler unit 31a capable of oscillating red (R) laser light are combined in a fiber bundle 37a through a lens 36a. Similarly, green laser light beams emitted from a laser coupler unit 31b capable of oscillating green (G) laser light, and blue laser light beams emitted from a laser coupler unit 31c capable of oscillating blue (B) laser light are made incident on fiber bundles 37b and 37c through lenses 36b and 36c, respectively. Then, the respective bundle fibers are bundled (N 2, M≧2).

Incidentally, in the second embodiment and the third embodiment shown in FIGS. 9 to 12, there are shown examples in which emitted light beams from the semiconductor lasers having different oscillation wavelength ranges are guided to one fiber bundle. However, other than this, it is possible to consider some methods to provide light of three primary colors.

A first method is modulation of a light source. That is, laser light of each color is periodically oscillated, and spatial color separation (modulation) is carried out by a spatial modulator at every period, so that a color image is obtained.

A second method is spatial modulation using a color filter. That is, if each color spatial-modulator includes, for every pixel, a filter to allow only a specific color to pass, a color image by the spatial modulator can be obtained by this. The combination of three primary colors can also be carried out at a portion of a spatial modulator as described in the following fourth embodiment.

(Fourth embodiment)

This embodiment is a structural example in which, for example, a reflection type spatial modulator such as a reflection type liquid crystal display element is used, and after three primary colors are combined at this portion of the spatial modulator, light is guided to, although not shown, a fiber bundle as shown in FIGS. 7A and 7B.

Figure 13:
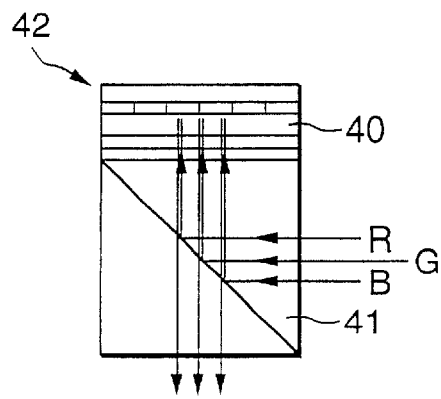
FIG. 13 is a schematic view showing the structure of the vicinity of a spatial modulator of an illuminating device according to a fourth embodiment.

As shown in FIG. 13, by using the foregoing method, when the illuminating light is made incident on a unit 42 composed of a reflection type spatial modulator 40 and a beam splitter 41 through a not-shown fiber bundle, three primary colors can be modulated by one spatial modulator (unit). Here, if the beam splitter 41 is replaced by a polarization beam splitter and a wavelength plate is disposed in the spatial modulator itself or on its light path, the modulation efficiency can be increased (N 1, M≧2).

Figure 14:
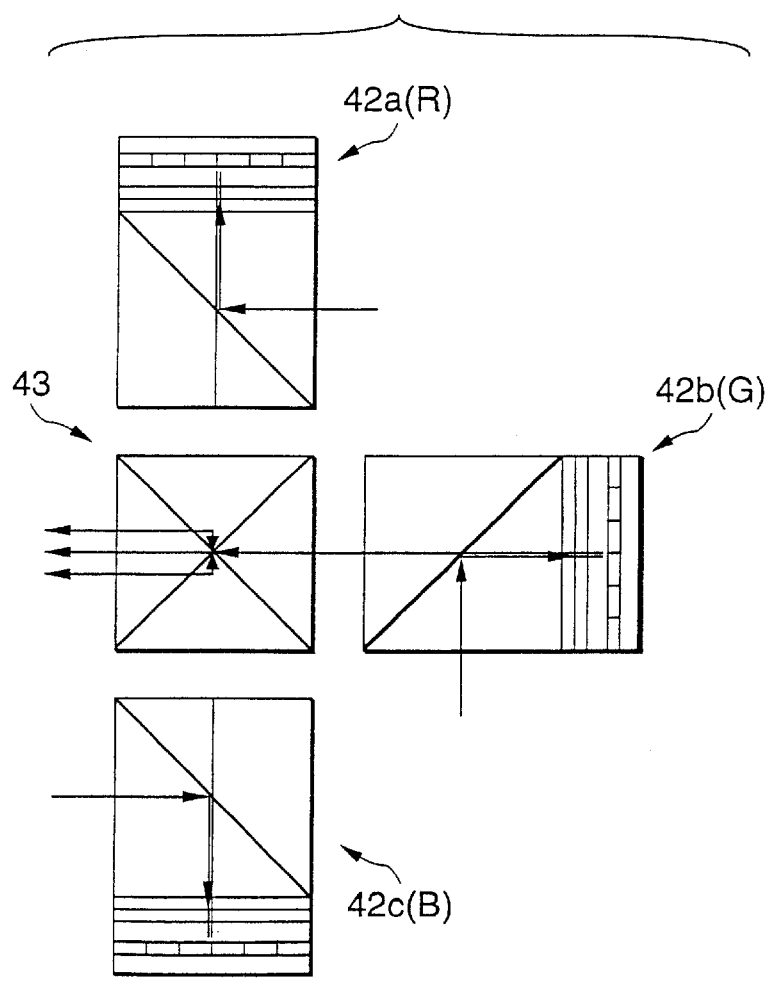
FIG. 14 is a schematic view showing the structure of the vicinity of another spatial modulator of the illuminating device according to the fourth embodiment.

FIG. 14 shows an example in which the unit shown in FIG. 13 is used for each color, that is, illuminating light beams are guided through not-shown fiber bundles to a red spatial modulator unit 42a, a green spatial modulator unit 42b, and a blue spatial modulator unit 42c, and after they are subjected to space modulation, they are combined by using a dichroic mirror 43 (N=1, M≧2).

Although this embodiment states the reflection type spatial modulator (reflection type light valve), a transmission type spatial modulator (for example, a transmission type liquid crystal display element) can be constructed in the same manner. As the reflection type spatial modulator, a digital micro mirror or the like may be used.

In the foregoing first embodiment to the fourth embodiment, the illuminating methods and the illuminating devices for mainly a displaying device (display) have been described. However, this invention is not limited to these embodiments, but various applications can be devised.

Next, description will be made on an example in which a light beam is divided in accordance with this invention, and the illuminating light from a fiber bundle is given a light path length difference of not less than the coherence length to light beams after division to produce a light source for a measuring device or a microscope.

Although not shown, when a hollow multi-mode optical fiber is used as the multi-mode bundle fiber, the application to laser light in an ultraviolet range can also be made. When this is used, it is possible to realize, for example, an ultraviolet ray exposure device in a manufacturing process of a semiconductor or the like. These can be easily realized by replacing the foregoing spatial modulator and the screen by, for example, a sample (object to be observed) and a human retina (or CCD etc.) in the case of a microscope, an object to be measured and an image input device in the case of a measuring device, and a mask and an exposed material in the case of an exposure device.

(Fifth embodiment)

This embodiment is an example in which this invention is applied to a measuring device.

Figure 15:
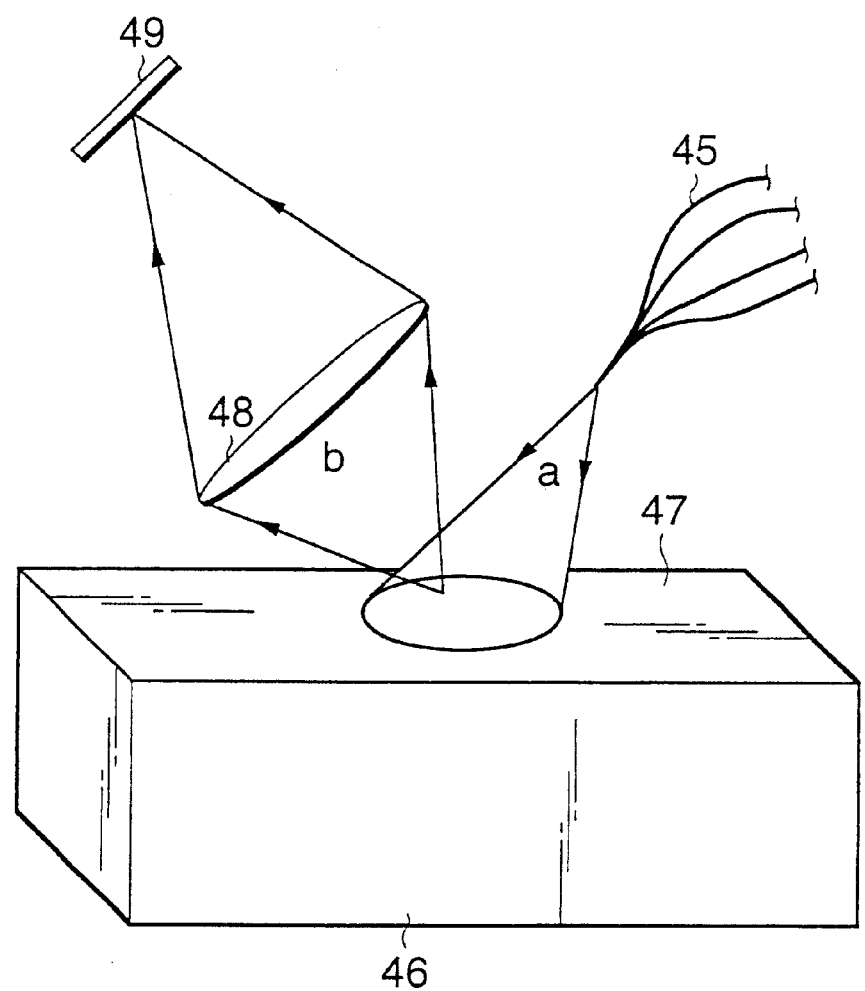
FIG. 15 is a schematic structural view showing a measuring device according to a fifth embodiment.

That is, as shown in FIG. 15, illuminating light "a" emitted from a fiber bundle 45 and having reduced coherence is projected on a measured object 46 having a surface 47 to be measured. When light beam "b" reflected by the surface 47 to be measured is detected by a light receiving unit 49 through an observation optical system 48, the properties of its surface (surface roughness, etc.), for example, can be measured.

Here, if there is a feature in spectral characteristics, such as transmissivity or reflectivity of the object to be measured, it is effective to use light of a wavelength suitable for that. For example, in a selecting apparatus or the like in an FA (Factory Automation), for the purpose of recognizing an object having a specific color, when laser light having a specific wavelength is applied, reflectivity to objects with other colors becomes different, so that its recognition becomes easy. In a solder tester, illuminating light in a green wavelength range is most effective from the viewpoint of reflectivity of a substrate. This can be realized by using a semiconductor laser in the green wavelength region. Further, by the method of this invention, the accuracy in examination is further improved.

That is, in the examining step, since speckle becomes a cause for noise if the coherence is reduced in accordance with this invention, the accuracy can be improved. When a specific wavelength filter is added to the observation optical system 48, it becomes possible to further improve the accuracy without receiving influence from disturbance light.

Here, it is also possible to consider observation with not only the reflected light of illuminating light, but also transmitting light or fluorescent light of the illuminating light. In this case as well, reducing the speckle of the illuminating light results in suppression of noise.

(Sixth embodiment)

This embodiment is an example in which a fiber bundle of this invention is used for an optical unit such as an exposure device or a microscope.

Figure 16:
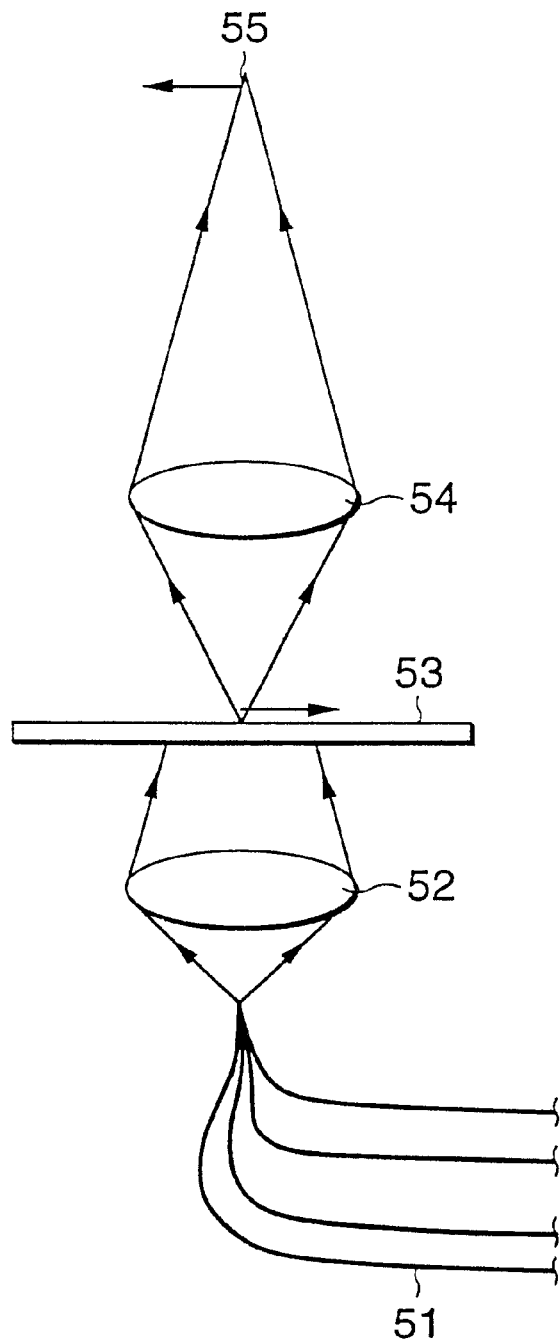
FIG. 16 is a schematic structural view showing an exposure device (or microscope) according to a sixth embodiment.

That is, as shown in FIG. 16, an emitted light beam from a fiber bundle 51 is applied to an object 53 to be illuminated through a condenser lens 52 in Kohler's illumination or critical illumination, and an image 55 of the illuminated object 53 is formed by using an object lens 54. Here, if the surface of the image is observed, a microscope is obtained. If a resist, a film, or the like is exposed (or recorded) with the image of the object 53 to be illuminated, an exposure device is obtained. Incidentally, as shown by an arrow in the drawing, the object lens 54 can be suitably moved.

Here, similarly to the foregoing fifth embodiment, if there is a feature in the spectral characteristics such as transmissivity or reflectivity of the object to be illuminated, it is effective to use light of a wavelength suitable for that. For example, if a resist or film as an exposure material has high sensitivity for a specific wavelength, it is effective to make exposure by that wavelength. This becomes possible, if a laser having a specific oscillation wavelength range and a narrow wavelength width is used. When the laser light is made to have reduced coherence by the method of this invention and the speckle is removed, an exposure process superior in contrast can be realized.

As an example, it is effective to use a light beam in a green wavelength region for recording of a digital audio track to a movie film, and if the method of this invention is used, this can be easily realized. As another example, it is possible to consider an exposure device in which a hollow waveguide is replaced by a fiber, and ultraviolet laser light of an excimer laser, harmonics of a solid-state laser, or the like is used. Since this not only suppresses the speckle, but also unifies the illumination distribution, the device becomes inexpensive, simple, and superior in performance.

In the case where a microscope is constructed, it is possible to realize a microscope that uses a single wavelength and has no speckle. Thus, it is possible to construct a spectral or fluorescent microscope by using characteristics of reflectivity or transmissivity of a sample. It is possible to consider wide application of this microscope, such as not only application for medicine or a living body, but also a process check of a semiconductor.

Further, in this embodiment as well, it is also possible to consider the use of not only reflected light of illumination, but also transmitting light or fluorescent light. In this case as well, to reduce the speckle of illuminating light results in suppression of noise.

(Seventh embodiment)

This embodiment is an example of a measuring device using the illuminating method of this invention.

Figure 17A:
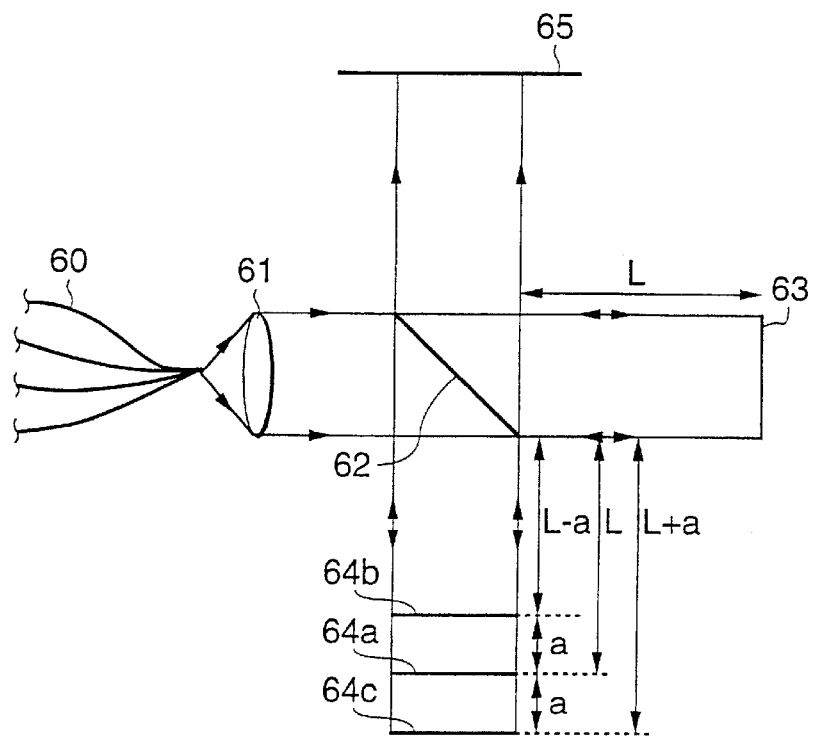
FIGS. 17A to 17C are schematic structural views showing a measuring device according to a seventh embodiment.

As an example of a measuring device other than the measuring device shown in the sixth embodiment, it is possible to consider the use of an interferometer such as a low coherent interferometer which has attracted attention in recent years. FIG. 17(A) shows an example of its structure.

That is, a light beam from a fiber bundle 60 is made parallel light by a collimator lens 61 and its wave front is divided by a beam splitter 62. One light beam (transmitting light) advances toward a reference mirror 63 (distance from the beam splitter is L) and the other light beam (reflected light) advances toward a test piece side.

Here, in the case where the coherence length of emitted light of a multi-mode fiber bundle is "a" or less, when a mirror at the test piece side is mirror 64*b* located at a position remote from the beam splitter by a distance L−a, or is a mirror 64*c* located at a position remote from the beam splitter by a distance L+a, interference stripes are hardly produced. On the other hand, like mirror 64*a*, only when a mirror is located at a position remote from the beam splitter by a distance L, interference stripes (speckle patterns) are produced.

Figure 17B:
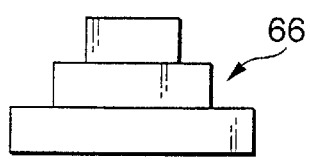
Figure 17C:

Here, instead of the mirrors 64*a*, 64*b*, and 64*c*, when a sample 66 having a three-dimensional shape as shown in FIG. 17(B) or a living body sample 67 as shown in FIG. 17(C) is placed and reflected light from this is observed as interference light, it is possible to observe the three-dimensional shape of the sample in a state where the sample is cut into round slices. When the contrast of the interference stripes is measured, this device can also be used as a length measuring device.

If the coherence length is designed based on the length of the multi-mode fiber bundle and the like, it is also possible to apply the device to various-uses. In this case as well, to suppress the speckle by reduction of coherence results in extreme decrease of noise at the time of observation or measurement, so that an improvement in accuracy and performance can be expected.

(Eighth embodiment)

Figure 18:
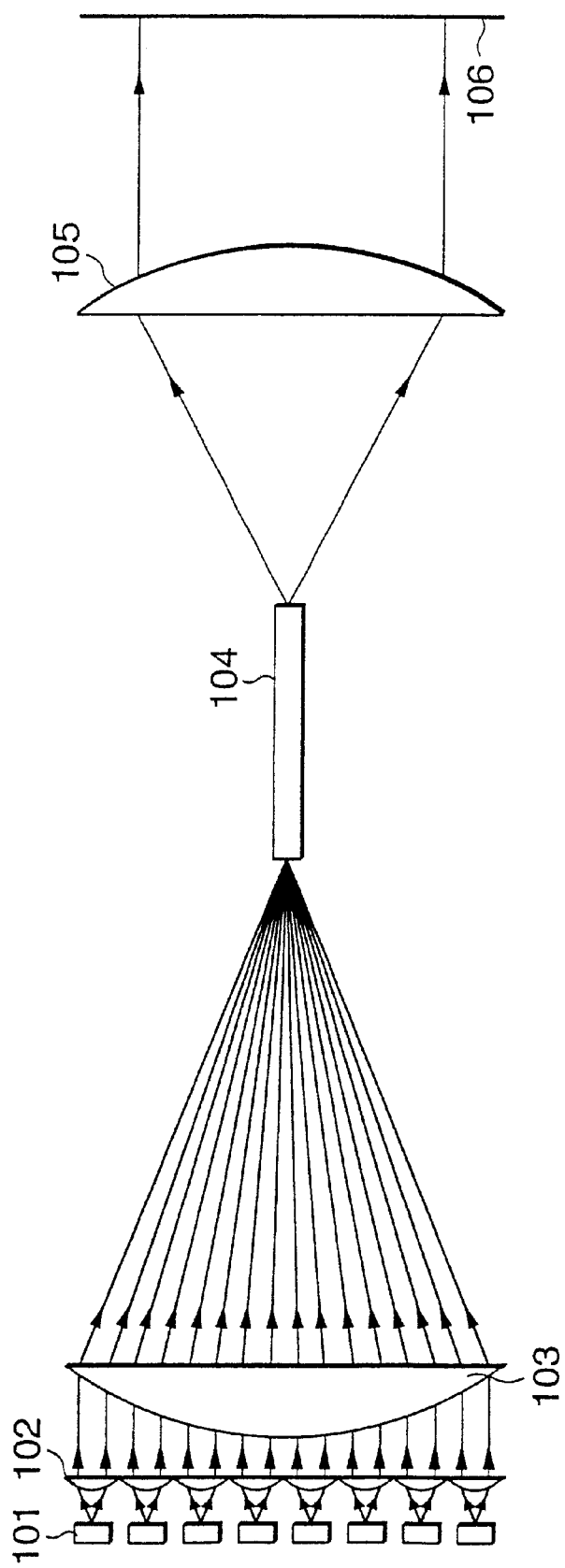
FIG. 18 is a schematic structural view showing an illuminating device according to an eighth embodiment.

Next, an example in which the number of light sources is one, will be described with reference to FIG. 18 (M=1, N≧2).

According to this embodiment, laser light oscillated from a light source 101 composed of semiconductor lasers arranged on a plane, a semiconductor array, or vertical resonator surface emitting lasers (VCSEL) is made pseudo-parallel light through lenses arranged on a plane or micro lens array 102, and this is condensed by one lens 103 to a multi-mode optical fiber 104. Light made uniform by the multi-mode optical fiber 104 is projected through a lens 105 on a screen 106 as an object to be illuminated.

In this case, since the number of divisions is one (M=1, that is, division is not made), it is desirable to use a number of light sources (that is, sufficiently large N) in order to sufficiently reduce the contrast of speckle to a wavelength width W of each laser.

Figure 19:
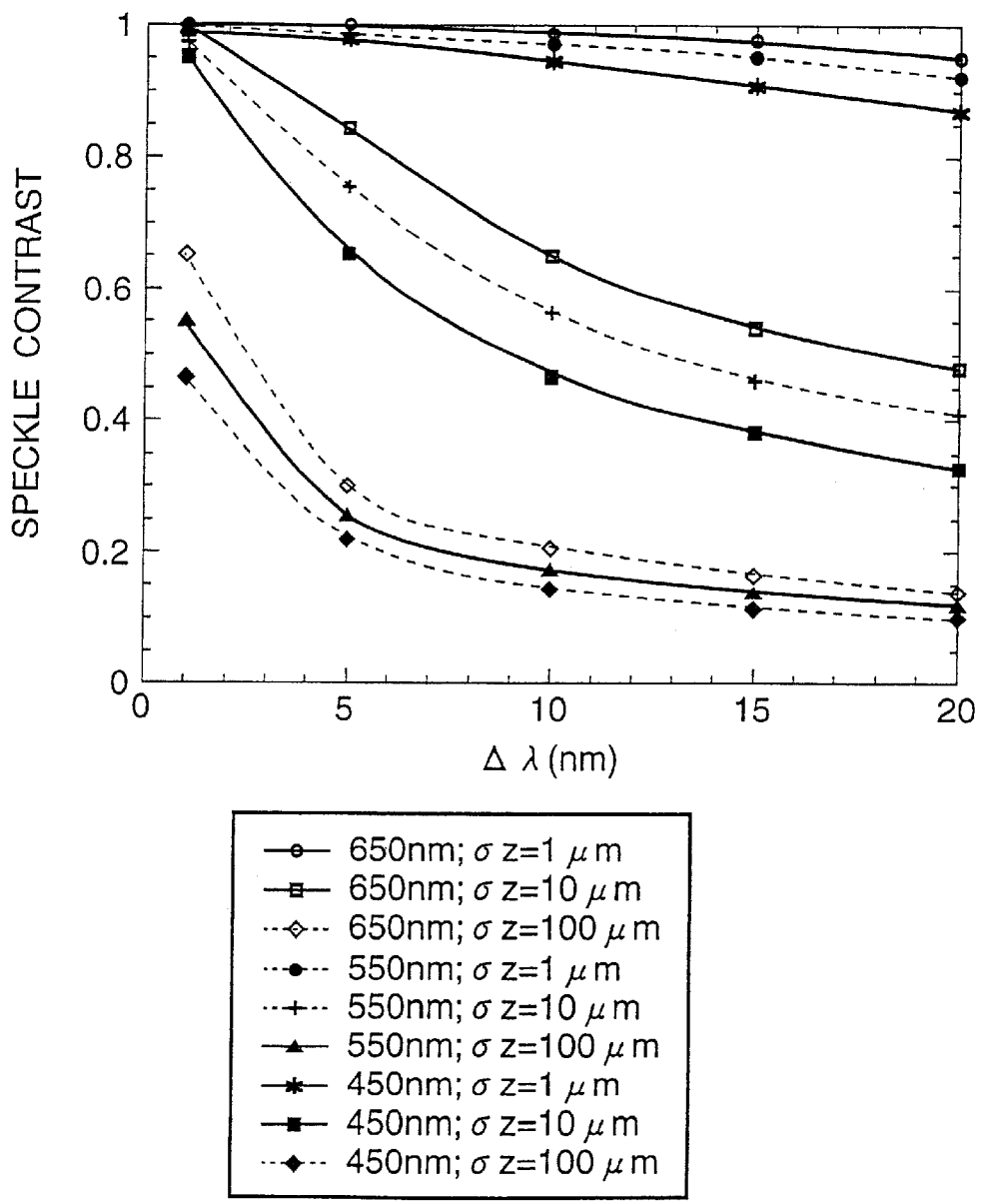
FIG. 19 is a graph showing the change of contrast of speckle due to a laser light wavelength spectrum width.

Here, in the case where the standard deviation of fluctuation of light path length (that is, twice the standard deviation of screen roughness) $\sigma_Z$ is 1 $\mu$m, 10 $\mu$m, and 100 $\mu$m, and the wavelength $\lambda$ is 650 nm, 550 nm, and 450 nm, the manner of change of the speckle produced by one light source with respect to the change of wavelength width is shown in FIG. 19.

In the case where the standard deviation $\sigma_Z$ of fluctuation of light path length and the wavelength $\lambda$ of laser light are constant, it is understood from FIG. 19 that there is a tendency that as the wavelength width $\Delta\lambda$ of laser light becomes large, the contrast of speckle is lowered. Moreover, it is understood that in the case where the standard deviation $\sigma_Z$ of fluctuation of light path length is constant, there is a tendency that as the wavelength of laser light becomes short, the contrast of speckle is apt to be lowered, and in the case where the wavelength of laser light is constant, as the standard deviation $\sigma_Z$ of fluctuation of light path length becomes large, the contrast of speckle is lowered.

Figure 20:
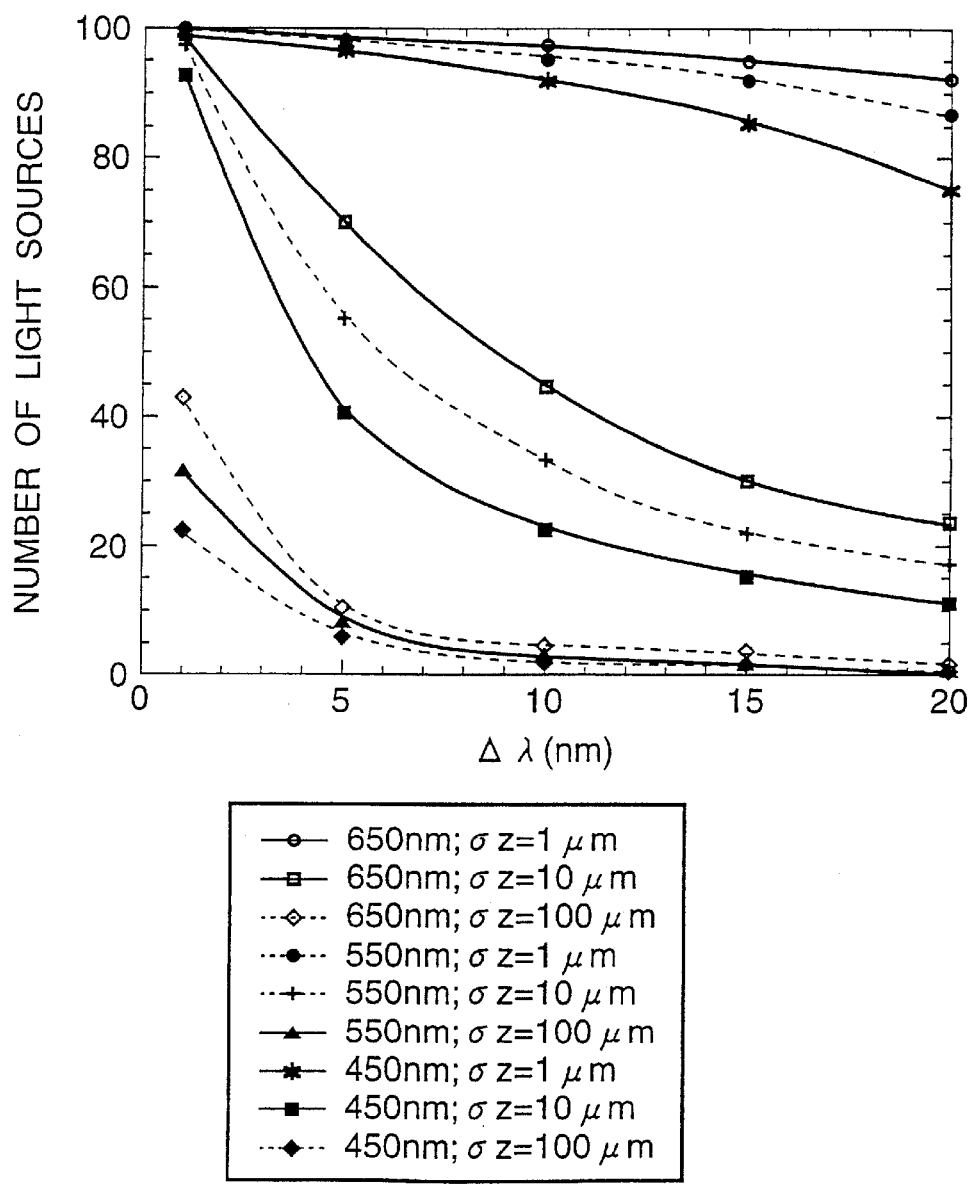
FIG. 20 is a graph showing the number of lasers required to suppress the speckle contrast to 10% in the eighth embodiment of this invention.
Figure 21:
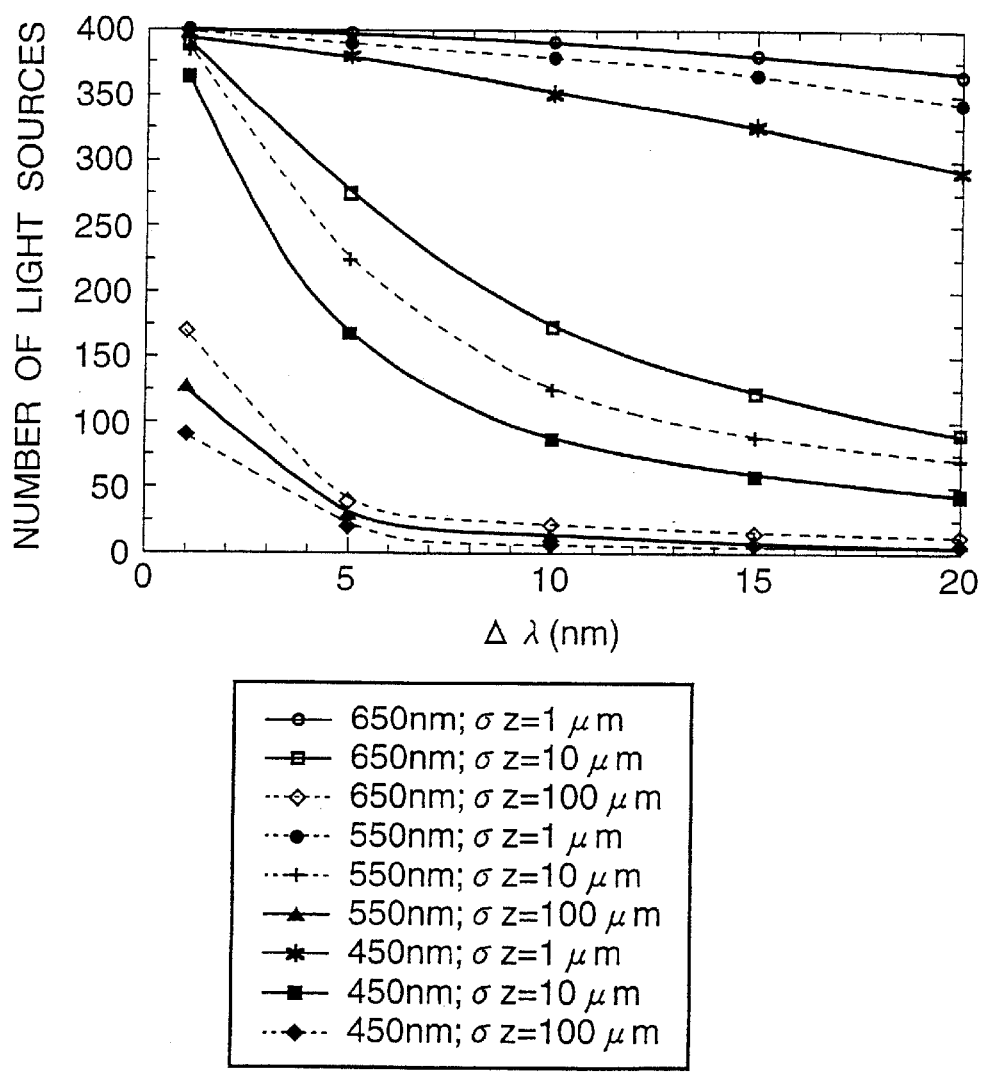
FIG. 21 is a graph showing the number of lasers required to suppress the speckle contrast to 5% in the eighth embodiment

Concerning the same cases, results obtained after considering the number of laser light sources required to lower the contrast of speckle by 10% and 5% is shown in FIG. 20 and FIG. 21.

That is, as typical values, in the case where the standard deviation of roughness of a screen is of the order of about 10 $\mu$m, and a semiconductor laser with a full width at half maximum of about several nm is used, it is understood from FIG. 20 that when the number of light sources is made about 100, the contrast of speckle of a light beam in a visible wavelength range can be lowered to 10% (this is a range permissible for a human eye). Further, it is understood from FIG. 21 that when the number of light sources is made about 400, the contrast of speckle can be lowered to 5%.

As described above, according to the embodiment, coherent control which is easy, is inexpensive, and has high performance is carried out for various kinds of lasers, and this invention can be applied to a light source with suppressed speckle and for illuminating an object. Further, when the multi-mode fiber is used as the optical fiber, by superimposition of spatial modes, it is possible to unify the intensity of illumination, and at the same time, it is possible to reduce the coherence simply, at low cost, and with saved space (that is, without receiving a restriction in space). Further, a display, a measuring device, a microscope, an exposure device, or the like can be constructed by using a semiconductor laser and the like having high photoelectric conversion efficiency. By this, it is possible to attain an improvement of performance, miniaturization, and reduction of cost of the device.

Although this invention has been described with reference to the preferred embodiments, this invention is not limited to these embodiments.

For example, it is desirable that the incident position of light (coherent light) in the optical fiber group (or fiber bundle) used in the first embodiment and the like is the same or substantially the same among the respective optical fibers. Besides, it is desirable that the optical fiber group is bundled at the light incident position as close as possible.

When some of the plurality of optical fibers are folded, the lengths of the optical fibers are made different from each other by the coherence length or more of the coherent light. The way of folding is not particularly limited, but various shapes to satisfy the condition of length are selected. Particularly, it is desirable that the multi-mode optical fiber is a plastic optical fiber in view of a high transmissivity, large radius of curvature, and the like.

Alternatively, a hollow multi-mode optical fiber is used as the optical fiber, and the coherent light may be made laser light in an ultraviolet range (that is, a laser for emitting laser light in the ultraviolet range may be used as the light source). By this, it is possible to realize an optical device (especially an exposure device, etc.) with a light beam in the ultraviolet range as a light source.

In the illuminating method and the illuminating device of this invention, the illuminating light is used to illuminate a spatial modulator made of a liquid crystal element, a micro mirror, or the like, and its image is projected on the screen, so that the speckle is suppressed and a displaying device (display) with high brightness and high fineness can be realized. Further, an object to be measured is illuminated by using this illuminating light, and measurement is carried out as to the shape of the object, the intensity of reflected and/or transmitted light, and the like, so that a measuring device with high measuring accuracy can be realized. Moreover, a microscope using this illuminating light, such as a fluorescent microscope, can be realized. Further, when this illuminating light (especially a laser in the ultraviolet range) is used as a light source and an object to be exposed is illuminated through a mask or the like, an exposure image with high contrast and deep focal depth can be obtained (especially an ultraviolet ray exposure device).

As described above, according to the first illuminating method of the present invention, in an optical system for forming an image of an object to be illuminated, a light beam emitted from N (N is an integer not less than 1) light sources is divided into M light beams (M is an integer not less than 2), a light path length difference of not less than a coherent distance is given to the light beams after division, and then, light axes of these light beams are again aligned with each other to illuminate the object with the light beams of coherence reduced by this, and when the light path length difference from one point on the object to be illuminated to an image corresponding thereto has a standard deviation $\sigma_z$, the number M and the number N are set so that the relation expressed by the following expression A is satisfied:

(numerical expression 34)      Expression A $$\sqrt{NM} \cdot \sqrt[4]{1 + (2 \cdot W \cdot \sigma_Z)^2} \geq 1$$

(in the expression A, "W" indicates a spectrum width of the wave number of the light beam emitted from the light source). Thus, for example, it is possible to reduce the speckle to a range (especially speckle contrast of 10%) sufficiently permissible for a human eye, and the light beam in which the contrast of speckle is sufficiently reduced can be used as illuminating light.

According to the first illuminating device of this invention, in an optical system for forming an image of an object to be illuminated, a light beam emitted from N (N is an integer not less than 1) light sources is divided into M divided light beams (M is an integer not less than 2), a light path length difference of not less than a coherent distance is given to the light beams after division, and then, light axes of these light beams are again aligned with each other to illuminate the object with the light beam of coherence reduced by this, and when the light path length difference from one point on the object to be illuminated to an image corresponding thereto has a standard deviation $\sigma_z$, the number M and the number N are set so that the relation expressed by the following expression A is satisfied:

(numerical expression 34)      Expression A $$\sqrt{NM} \cdot \sqrt[4]{1 + (2 \cdot W \cdot \sigma_Z)^2} \geq 1$$

(in the expression A, "W" indicates a spectrum width of the wave number of the light beam emitted from the light source). Thus, the first illuminating method of this invention can be carried out with good reproducibility.

According to the second illuminating method of this invention, in an optical system for forming an image of an object to be illuminated, after light axes of light beams emitted from N' (N' is an integer of 2 or more) light sources are aligned with each other, the coherence of the light beams is reduced, and the object to be illuminated is illuminated with the light beams of coherence reduced by this, and when a light path length difference from one point on the object to be illuminated to an image corresponding thereto has a standard deviation $\sigma_z$, the number N' is set so that the relation expressed by the following expression D is satisfied:

(numerical expression 47)      Expression D $$\sqrt{N'} \cdot \sqrt[4]{1 + (2 \cdot W \cdot \sigma_Z)^2} \geq 1$$

(in the expression D, "W" indicates a spectrum width of the wave number of the light beam emitted from the light source). Thus, for example, it is possible to reduce the speckle to a range (especially speckle contrast of 10%) sufficiently permissible for a human eye, and the light beam in which the contrast of speckle is sufficiently reduced can be used as illuminating light.

According to the second illuminating device of this invention, in an optical system for forming an image of an object to be illuminated, after light axes of light beams emitted from N' (N' is an integer of 2 or more) light sources are aligned with each other, the coherence of the light beams is reduced, and the object to be illuminated is illuminated with the light beams of coherence reduced by this, and when the light path length difference from one point on the object to be illuminated to an image corresponding thereto has a standard deviation $\sigma_Z$, the number $N'$ is set so that the relation expressed by the following expression D is satisfied:

(numerical expression 47)     Expression D $$\sqrt{N'} \cdot \sqrt[4]{1+(2 \cdot W \cdot \sigma_Z)^2} \geq 1$$

(in the expression D, "W" indicates a spectrum width of the wave number of the light beam emitted from the light source). Thus, the second illuminating method of this invention can be carried out with good reproducibility.

What is claimed is:

1. An illuminating method using an optical system for forming an image of an object to be illuminated in which a light beam emitted from N (N is an integer not less than 1) light sources is divided into M light beams (M is an integer not less than 2), a light path length difference of not less than a coherent distance is given to the light beams after division, and then, light axes of these light beams are again aligned with each other to illuminate said object with the light beams of coherence reduced by this, wherein when the light path length difference from one point on said object to be illuminated to an image corresponding thereto has a standard deviation $\sigma_Z$, the number M and the number N are set so that a relation expressed by the following expression A is satisfied:

(numerical expression 1)     Expression A $$\sqrt{NM} \cdot \sqrt[4]{1+(2 \cdot W \cdot \sigma_z)^2} \geq 1$$

where, "W" indicates a spectrum width of wave number of the light beam emitted from said light source.

2. An illuminating method according to claim 1, wherein when a center wavelength of the light beam emitted from said light source is $\lambda_0$, a full width at half maximum of a wavelength spectrum is $\Delta\lambda$, a spectrum width of wave number is W, and a spectrum of wave number is S(k), the following expressions B and C are established:

(numerical expression 2)     Expression B $$W = \frac{\pi}{\sqrt{2}} \cdot \frac{\Delta k}{\lambda_0^2}$$

Expression C $$S(k) = \frac{Exp\left[-\frac{(k-k_0)^2}{2 \cdot W^2}\right]}{\sqrt{2\pi} \cdot W}.$$

3. An illuminating method according to claim 1, wherein the number M and the number N are set so that relation expressed by the following expression A' is satisfied:

(numerical expression 3)     Expression A'

$$\sqrt{NM} \cdot \sqrt[4]{1+(2 \cdot W \cdot \sigma_z)^2} \geq 2.$$

4. An illuminating method according to claim 1, wherein in order to give the light path length difference of not less than the coherent distance to the light beams after division, the light beam emitted from said light source is incident on an optical fiber group in which a plurality of optical fibers with lengths different from each other by not less than the coherence length are bundled.

5. An illuminating method according to claim 4, wherein a multi-mode optical fiber is used as said optical fiber.

6. An illuminating method according to claim 1, wherein the light beam emitted from said light source is laser light in a visible light wavelength range, and illuminates a film or spatial modulator as said object to be illuminated.

7. An illuminating method according to claim 6, wherein the light beam is laser light emitted from a semiconductor laser, or laser light by nonlinear wavelength conversion of laser light emitted from a solid-state laser.

8. An illuminating method according to claim 1, wherein the number of light sources is made one, and the light beam emitted from said light source is divided into plural beams.

9. An illuminating method according to claim 1, wherein the number of light sources is made plural, and each of the light beams emitted from said light sources are divided into plural beams.

10. An illuminating method according to claim 1, wherein a number selected from the group of numbers consisting of the number M and the number N is 100 or more.

11. An illuminating method according to claim 1, wherein the light beam of reduced coherence is an illuminating light beam used for a device selected from the group of devices consisting of a display device, a measuring device, a microscope, and an exposure device.

12. An illuminating device comprising an optical system for forming an image of an object to be illuminated in which a light beam emitted from N (N is an integer not less than 1) light sources is divided into M divided light beams (M is an integer not less than 2), a light path length difference of not less than a coherent distance is given to the light beams after division, and then, light axes of these light beams are again aligned with each other to illuminate said object with the light beam of coherence reduced by this, wherein when the light path length difference from one point on said object to be illuminated to an image corresponding thereto has a standard deviation $\sigma_Z$, the number M and the number N are set so that a relation expressed by the following expression A is satisfied:

(numerical expression 4)     Expression A $$\sqrt{NM} \cdot \sqrt[4]{1+(2 \cdot W \cdot \sigma_z)^2} \geq 1$$

where, "W" indicates a spectrum width of wave number of the light beam emitted from said light source.

13. An illuminating device according to claim 12, wherein when a center wavelength of the light beam emitted from said light source is $\lambda_0$, a full width at half maximum of a wavelength spectrum is $\Delta\lambda$, a spectrum width of wave number is W, and a spectrum of the wave number is S(k), the following expressions B and C are established:

(numerical expression 5)     Expression B $$W = \frac{\pi}{\sqrt{2}} \cdot \frac{\Delta k}{\lambda_0^2}$$

Expression C $$S(k) = \frac{Exp\left[-\frac{(k-k_0)^2}{2 \cdot W^2}\right]}{\sqrt{2\pi} \cdot W}.$$

14. An illuminating device according to claim 12, wherein the number M and the number N are set so that a relation expressed by the following expression A' is satisfied:

(numerical expression 6)     Expression A'

$$\sqrt{NM} \cdot \sqrt[4]{1+(2 \cdot W \cdot \sigma_z)^2} \geq 2.$$

15. An illuminating device according to claim 12, wherein in order to give the light path length difference of not less than the coherent distance to the light beams after division, the light beam emitted from said light source is incident on an optical fiber group in which a plurality of optical fibers with lengths different from each other by not less than a coherence length are bundled.

16. An illuminating device according to claim 15, wherein a multi-mode optical fiber is used as said optical fiber.

17. An illuminating device according to claim 12, wherein the light beam emitted from said light source is made laser light in a visible light wavelength range, and illuminates a film or spatial modulator as said object to be illuminated.

18. An illuminating device according to claim 17, wherein the light beam is made laser light emitted from a semiconductor laser, or laser light by nonlinear wavelength conversion of laser light emitted from a solid-state laser.

19. An illuminating device according to claim 12, wherein the number of light sources is one, and the light beam emitted from said light source is divided into plural beams.

20. An illuminating device according to claim 12, wherein the number of light sources is plural, and each of the light beams emitted from said light sources is divided into plural beams.

21. An illuminating device according to claim 12, wherein a number selected from the group of numbers consisting of the number M and the number N is 100 or more.

22. An illuminating device according to claim 12, wherein the light beam of the reduced coherence is used as an illuminating light beam for a device selected from the group of devices consisting of a display device, a measuring device, a microscope, and an exposure device.

23. An illuminating method using an optical system for forming an image of an object to be illuminated in which after light axes of light beams emitted from N' (N' is an integer of 2 or more) light sources are aligned with each other, coherence of the light beams is reduced, and said object to be illuminated is illuminated with the light beams of coherence reduced by this, wherein when a light path length difference from one point on said object to be illuminated to an image corresponding thereto has a standard deviation $\sigma_z$, the number N' is set so that a relation expressed by the following expression D is satisfied:

(numerical expression 7)     Expression D'

$$\sqrt{N'} \cdot \sqrt[4]{1+(2 \cdot W \cdot \sigma_z)^2} \geq 2.$$

where, "W" indicates a spectrum width of wave number of the light beam emitted from said light source.

24. An illuminating method according to claim 23, wherein when a center wavelength of the light beam emitted from said light source is $\lambda_O$, a full width at half maximum of a wavelength spectrum is $\Delta\lambda$, a spectrum width of wave number is W, and a spectrum of the wave number is S(k), the following expressions B and C are established:

(numerical expression 8)     Expression B $$W = \frac{\pi}{\sqrt{2}} \cdot \frac{\Delta k}{\lambda_0^2}$$

Expression C $$S(k) = \frac{Exp\left[-\frac{(k-k_0)^2}{2 \cdot W^2}\right]}{\sqrt{2\pi} \cdot W}.$$

25. An illuminating method according to claim 23, wherein the number N' is set so that a relation expressed by the following expression D' is satisfied:

(numerical expression 9)     Expression D $$\sqrt{N'} \cdot \sqrt[4]{1+(2 \cdot W \cdot \sigma_z)^2} \geq 1.$$

26. An illuminating method according to claim 23, wherein the light beam emitted from said light source is laser light in a visible light wavelength range, and illuminates a film or spatial modulator as said object to be illuminated.

27. An illuminating method according to claim 26, wherein the light beam is laser light emitted from a semiconductor laser or laser light by nonlinear wavelength conversion of laser light emitted from a solid-state laser.

28. An illuminating method according to claim 23, wherein the number N' is 100 or more.

29. An illuminating method according to claim 23, wherein the light beam of reduced coherence is made an illuminating light beam used for a device selected from the group of devices consisting of a display device, a measuring device, a microscope, and an exposure device.

30. An illuminating device comprising an optical system for forming an image of an object to be illuminated in which after light axes of light beams emitted from N' (N' is an integer of 2 or more) light sources are aligned with each other, coherence of the light beams is reduced, and said object to be illuminated is illuminated with the light beams of coherence reduced by this, wherein when a light path length difference from one point on said object to be illuminated to an image corresponding thereto has a standard deviation $\sigma_z$, the number N' is set so that a relation expressed by the following expression D is satisfied:

(numerical expression 10)     Expression D $$\sqrt{N'} \cdot \sqrt[4]{1+(2 \cdot W \cdot \sigma_z)^2} \geq 1$$

where, "W" indicates a spectrum width of wave number of the light beam emitted from said light source.

31. An illuminating device according to claim 30, wherein when a center wavelength of the light beam emitted from said light source is $\lambda_O$, a full width at half maximum of wavelength spectrum is $\Delta\lambda$, a spectrum width of wave number is W, and a spectrum of the wave number is S(k), the following expressions B and C are established:

(numerical expression 11) Expression B
$$W = \frac{\pi}{\sqrt{2}} \cdot \frac{\Delta k}{\lambda_0^2}$$

Expression C
$$S(k) = \frac{Exp\left[-\frac{(k-k_0)^2}{2 \cdot W^2}\right]}{\sqrt{2\pi} \cdot W}.$$

32. An illuminating device according to claim 30, wherein the number N' is set so that a relation expressed by the following expression D' is satisfied:

(numerical expression 12) Expression D'
$$\sqrt{N'} \cdot \sqrt[4]{1 + (2 \cdot W \cdot \sigma_z)^2} \geq 2.$$

33. An illuminating device according to claim 30, wherein the light beam emitted from said light source is laser light in a visible light wavelength region, and illuminates a film or spatial modulator as said object to be illuminated.

34. An illuminating device according to claim 30, wherein the light beam is laser light emitted from a semiconductor laser or laser light by nonlinear wavelength conversion of laser light emitted from a solid-state laser.

35. An illuminating device according to claim 30, wherein the number N' is 100 or more.

36. An illuminating device according to claim 30, wherein the light beam of reduced coherence is an illuminating light beam used for a device selected from the group of devices consisting of a display device, a measuring device, a microscope, and an exposure device.

* * * * *

UNITED STATES PATENT AND TRADEMARK OFFICE
CERTIFICATE OF CORRECTION

PATENT NO. : 6,249,381 B1
DATED : June 19, 2001
INVENTOR(S) : Hiroshi Suganuma

It is certified that error appears in the above-identified patent and that said Letters Patent is hereby corrected as shown below:

Column 4,
Lines 22-28, delete the formula in its entirety and replace it with the following formula:

$$C = \sqrt{\frac{\iint \Gamma(X_1,X_2)\Gamma(X_3,X_4)K(X'-X_1)K^*(X'-X_2)K(X'-X_3)K^*(X'-X_4) \times \exp[R(X_1-X_2)+R(X_3-X_4)] \times \{\exp[-R(X_1-X_3)-R(X_2-X_4)+R(X_1-X_4)+R(X_3-X_2)]-1\} \times dx_1 dx_2 dx_3 dx_4}{\int\int \Gamma(X_1,X_2)K(X'-X_1)K^*(X'-X_2)\exp[R(X_1-X_2)]dx_1 dx_2}}$$

Column 10,
Line 66, change "forgiving" to -- for giving --.

Column 16,
Line 23, after "as" insert -- a --.

Column 19,
Line 54, change "N 1" to -- N=1 --.

Signed and Sealed this

Fourteenth Day of May, 2002

*Attest:*

*Attesting Officer*

JAMES E. ROGAN
*Director of the United States Patent and Trademark Office*